United States Patent

Saoyama et al.

[11] Patent Number: 5,995,471
[45] Date of Patent: Nov. 30, 1999

[54] EDITING DEVICE AND EDITING METHOD

[75] Inventors: Hiroyuki Saoyama; Yasuo Sato, both of Kanagawa, Japan

[73] Assignee: Sony Corporation, Tokyo, Japan

[21] Appl. No.: 08/943,902

[22] Filed: Oct. 3, 1997

[30] Foreign Application Priority Data

Oct. 7, 1996 [JP] Japan .................................. 8-284720

[51] Int. Cl.⁶ ...................................................... G11B 7/00
[52] U.S. Cl. ................................ 369/83; 369/84; 369/48; 369/58
[58] Field of Search ................................. 369/83, 84, 85, 369/47, 48, 49, 50, 54, 58, 59, 60, 32; 360/13, 14.1, 14.2, 15, 54

[56] References Cited

U.S. PATENT DOCUMENTS 5,590,100 12/1996 Ogusu et al. ....................... 369/58 X
5,784,349 7/1998 Ogusu et al. ....................... 369/58

Primary Examiner—Muhammad Edun
Attorney, Agent, or Firm—Limbach & Limbach L.L.P.

[57] ABSTRACT

According to the present invention, there is provided an editing device for editing a plurality of channel data recorded on a record medium having a unit of writing data determined to be a predetermined data unit length, in which in performing an editing processing with respect to specific channel data having a length that is equal to or shorter than the predetermined data unit length designated by a user, the predetermined data unit length including the specific channel data is reproduced and stored to a memory, the editing operation is performed on the memory and the predetermined data unit length after the editing operation is read from the memory and is again recorded on the record medium whereby the editing processing such as copying, moving, exchanging, erasing and the like can be performed with respect to the short data of the predetermined data unit length or shorter.

8 Claims, 24 Drawing Sheets

FIG. 3

| 16 BITS | | 16 BITS | | |
|---|---|---|---|---|
| MSB   LSB | MSB   LSB | MSB   LSB | MSB   LSB | |
| 00000000 | 11111111 | 11111111 | 11111111 | 0 |
| 11111111 | 11111111 | 11111111 | 11111111 | 1 |
| 11111111 | 11111111 | 11111111 | 00000000 | 2 |
| cluster H | cluster L | 00000000 | 00000000 | 3 |
| 00000000 | 00000000 | 00000000 | 00000000 | 4 |
| 00000000 | 00000000 | 00000000 | 00000000 | 5 |
| 00000000 | 00000000 | 00000000 | 00000000 | 6 |
| Maker code | Model code | First TNO | Last TNO | 7 |
| 00000000 | 00000000 | 00000000 | Used Sectors | 8 |
| 00000000 | 00000000 | 00000000 | 00000000 | 9 |
| 00000000 | 00000000 | 00000000 | Disc Serial NO | 10 |
| DISC ID | | P-DFA | P-EMPTY | 11 |
| P-FRA | P-TNO 1 | P-TNO 2 | P-TNO 3 | 12 |
| P-TNO 4 | P-TNO 5 | P-TNO 6 | P-TNO 7 | 13 |
| ~ | ~ | ~ | ~ | |
| P-TNO 248 | P-TNO 249 | P-TNO 250 | P-TNO 251 | 74 |
| P TNO 252 | P TNO 253 | P TNO 254 | P TNO 255 | 75 |
| 00000000 | 00000000 | 00000000 | 00000000 | 76 |
| 00000000 | 00000000 | 00000000 | 00000000 | 77 |
| Start address | | Track mode | | 78 |
| End address | | Link-P | | 79 |
| ~ | | ~ | | |
| Start address | | Track mode | | 586 |
| End address | | Link-P | | 587 |

FIG. 7
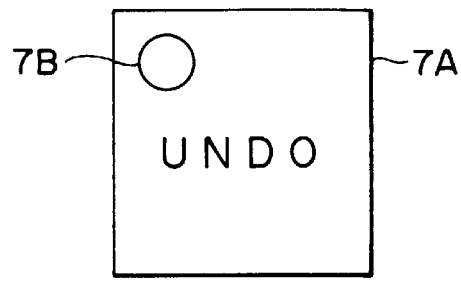
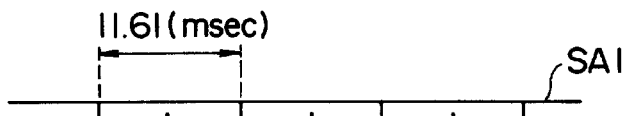
FIG. 10A
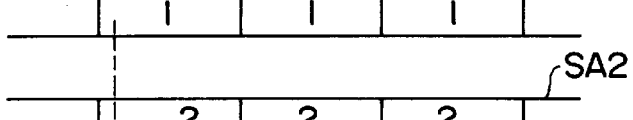
FIG. 10B
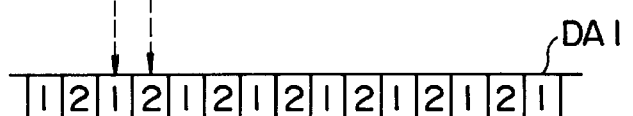
FIG. 10C
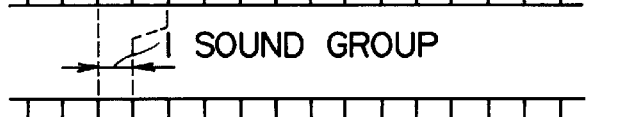
FIG. 10D
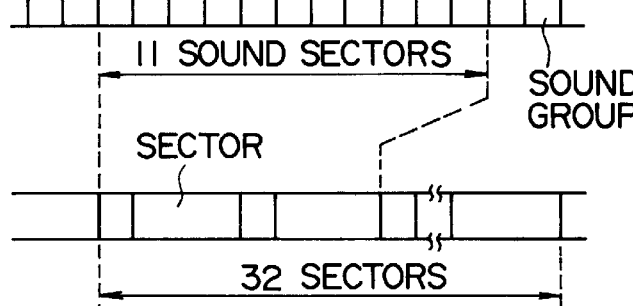
FIG. 10E
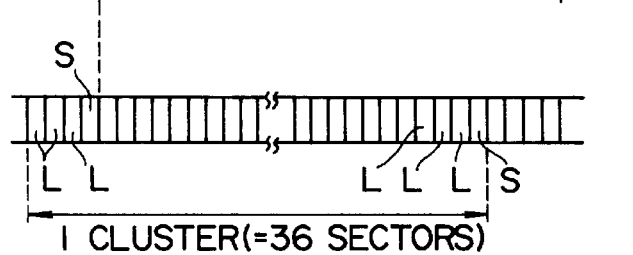
FIG. 10F

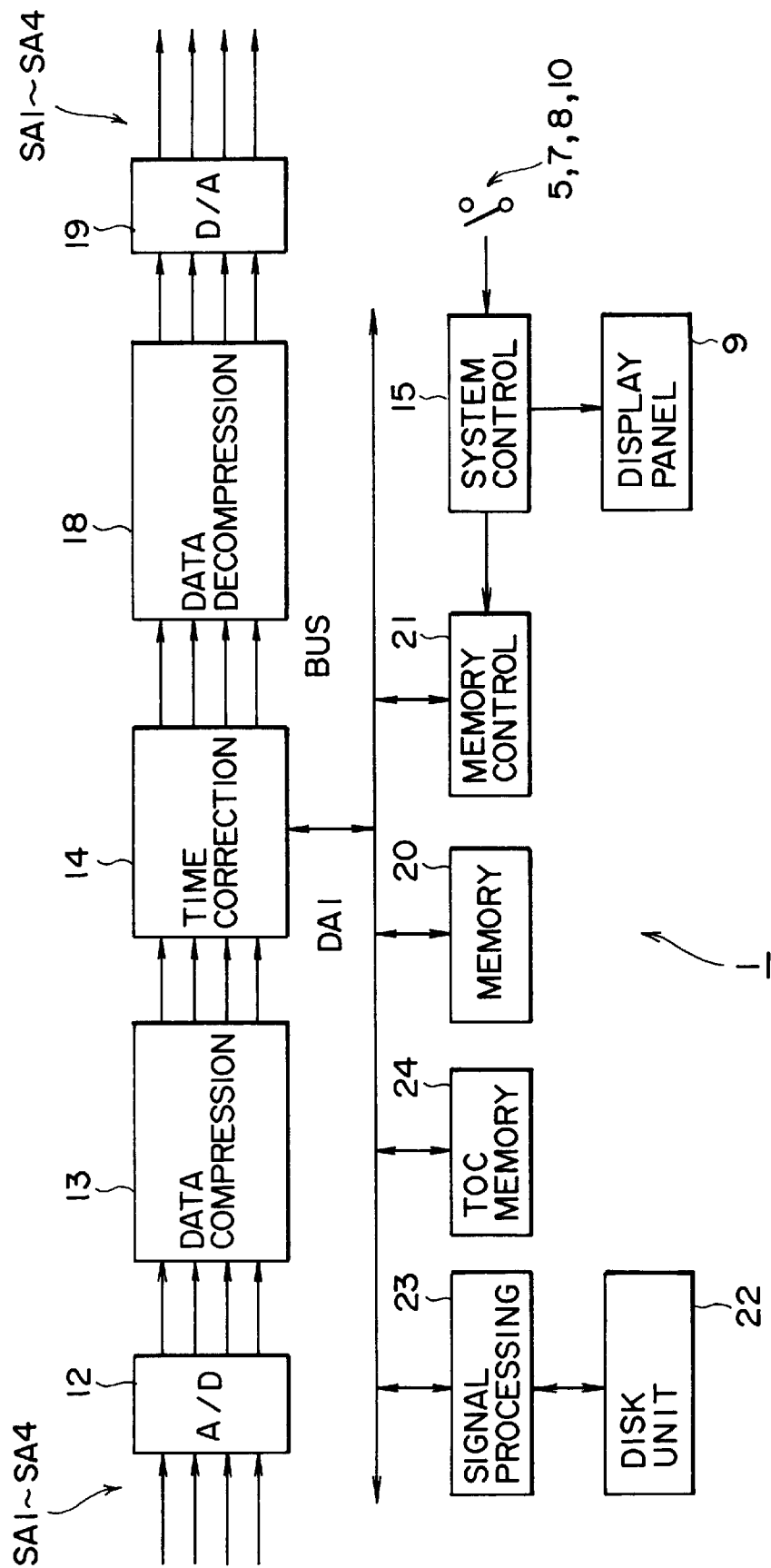

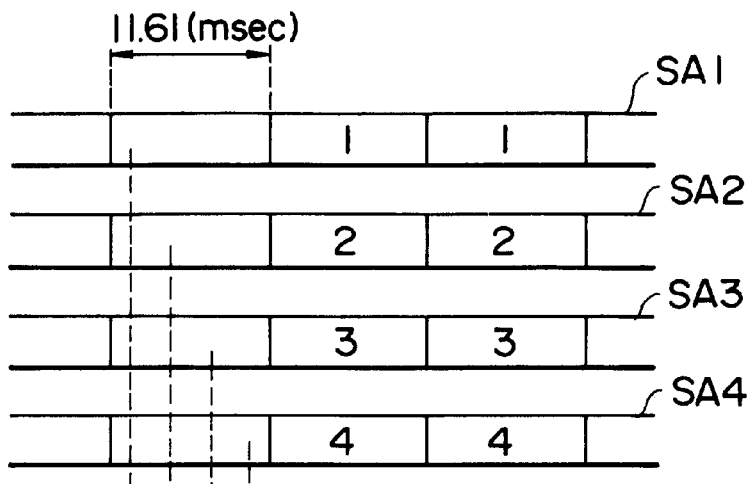
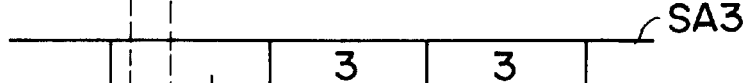
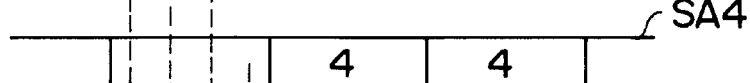
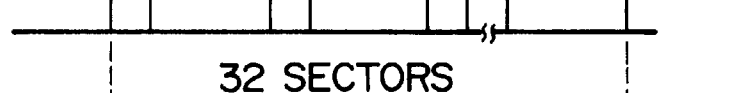
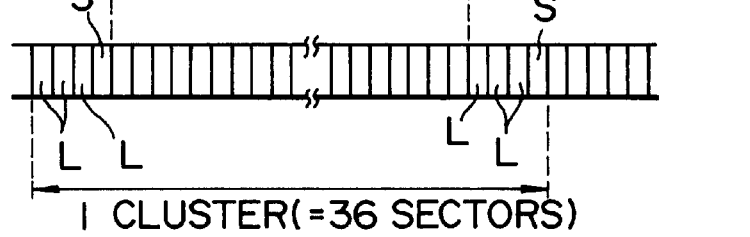

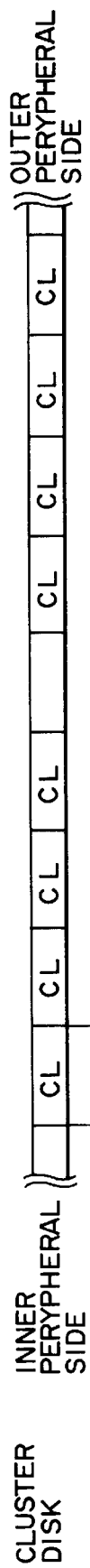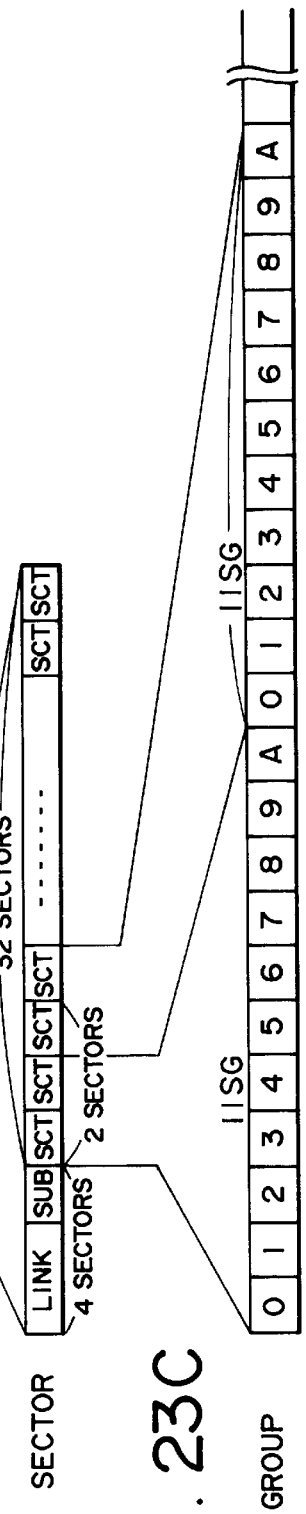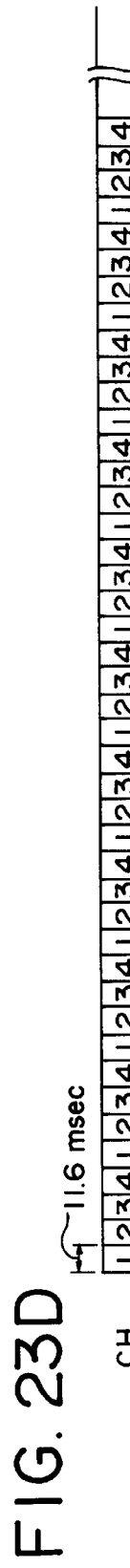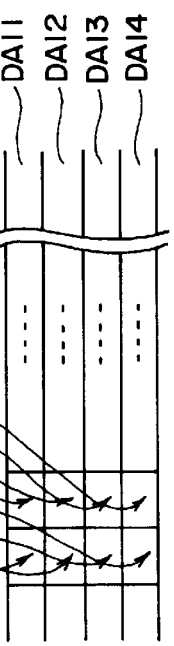
FIG. 23A, FIG. 23B, FIG. 23C, FIG. 23D, FIG. 23E

EDITING DEVICE AND EDITING METHOD

BACKGROUND OF THE INVENTION

1. Field of the Invention

The present invention relates to an editing device. For example, the present invention is applicable to the case where audio data recorded in a magneto-optic disk device is edited. The present invention is capable of editing audio data among a plurality of channels by reading audio data at a pre edit portion from a record medium and recording the data at a post edit portion after processing it.

2. Description of Related Art

Conventionally, in a magneto-optic disk device, continuous audio data is recorded in the unit of cluster and recorded audio data is controlled by a UTOC (User-Table of Contents).

FIGS. 1A, 1B, 1C and 1D are outline diagrams showing the constitution of a cluster. An magneto-optic disk device inputs to an audio compression circuit audio data of right and left channels that is successively inputted and respectively blocks the audio data at a predetermined period (11.61 msec). Further, after compressing the audio data in respect of a time axis in the unit of block, the audio data (R and L) of the right and left channels are multiplexed as shown by FIG. 1D. Hereinafter, audio data having the period of 11.61 msec of the two channels that is compressed in respect of a time axis, is referred to as sound group.

The magneto-optic disk device forms one sound frame by continuous eleven sound groups as shown by FIG. 1C. As shown by FIG. 1B, one sound frame is allotted to two sectors. Further, as shown by FIG. 1A, three link sectors L and one sub sector S are added to 32 sectors allocated with the audio data and one cluster is formed by 36 sectors. Incidentally, the link sector L is a sector for connecting clusters allocated with predetermined data having no significance in place of audio data and sub sector S is a sector allocated with sub data.

As shown by FIG. 2 in a style of a table, each sector is constituted by data of 2352 bytes and a region thereof represented by longitudinal direction addresses of "0" through "3", is allocated to a header. In respect of the header, the regions of longitudinal direction addresses of "0" through "2" of 12 bytes, are allocated to synchronization (sync) patterns and addresses of clusters are allocated to a first byte and a second byte of the successive longitudinal direction address "3". Further, an address of a sector is allocated and a mode of a magneto-optic disk is recorded. Successive to the header, the main data area of 2336 bytes is formed and audio data that is compressed in respect of a time axis is allocated to the region in the unit of a sound group.

According to the magneto-optic disk device of this kind, successively inputted audio data is successively allocated to a cluster in this way, the audio data is recorded successively in unrecorded regions and the audio data is overwritten and recorded successively in erasable regions. In this case, when it becomes difficult to record a series of audio data to one continuous region, the remaining audio data is recorded in other recordable region or erasable region in the unit of cluster.

In respect of the audio data record of the unit of cluster, according to the magneto-optic disk, record regions are formed on an inner peripheral side of the magneto-optic disk and the audio data is controlled by control data recorded in the control region.

According to the magneto-optic disk, the UTOC data is allocated to the control data. When the magneto-optic disk is loaded, the magneto-optic disk device gains access to the UTOC data and rewrites the UTOC data as necessary when the UTOC is requested to rewrite as in cutting off power source, discharging the magneto-optic disk or the like.

In the UTOC data, a first through a fourth sector are set in the unit of sector similar to the case of audio data and the second through the fourth sectors among them, are set to option. In the first sector (that is, sector 0) as shown by FIG. 3, cluster addresses are allocated in succession to the header and thereafter, data of 00h, fabrication maker of recording device, model code of recording (Maker code, Model code), start number and finish number of recorded program First TNO, Last TNO and the like are allocated successively.

The first sector is successively allocated with identification data of disk (DISC.ID), a pointer showing a front slot of a position of a defective area in a program region (Pointer for Defective Area: P-DFA), with respect to slot, mentioned later, a pointer showing a front slot of vacant slot (Pointer for Empty Slot: P-EMPTY), and a pointer showing a front slot of a recordable region in a program region (Pointer for Freely Area: P-FRA).

Further successively, pointers (P-TNO1, . . . , P-TNO255) are allocated and in regions of a longitudinal address "76" or thereafter, slots in the unit of 8 bytes are allocated. Here, each slot is recorded with a start address (Start address), an end address (End address), a track mode (Track mode) and a link pointer (Link-P).

Here, pointers (P-TNO1, . . . , P-TNO255) correspond to a musical composition recorded on the magneto-optic disk and designate addresses of corresponding slots. Further, start address (Start address) and end address (End address) designate a record start position and record finish position of continuous audio data by cluster address, sector address and sound group. Hereinafter, a record unit designated by start address (Start address) and end address (End address) is referred to as part. When continuous audio signals are divided and recorded to other regions of the magneto-optic disk, link pointer (Link-P) designates a slot corresponding to continuous audio signal (comprising continuous parts). Incidentally, mode data (Track mode) records a mode of each part. The mode data records identification data of copy prohibition/allowance, audio data/computer data and the like.

Thereby, as shown by, for example, FIG. 4, when audio data is recorded firstly on a magneto-optic disk where no audio data is recorded, audio data is recorded in the magneto-optic disk by forming parts P1, P2, P3 and P4 corresponding to the respective musical plays such that the first musical composition, the second musical composition, are successively and continuously played by designating pointers (P-FRA) representing front positions of recordable regions. In correspondence thereto, start addresses and end addresses of the respective parts P1, P2, P3 and P4 are successively recorded in the respective slots and slots of respective plays are designated by the respective pointers P-TNO1, P-TNO2, P-TNO3 and P-TNO4.

Incidentally, when the second musical composition is intended to erase in the continuously recorded audio data, the magneto-optic disk device connects a slot in correspondence with the erase program to a final slot linked by P-FRA. That is, the pointer (P-FRA) designates a corresponding slot similar to the pointers (P-FRA, P-TNO1, . . . , P-TNO255). Thereby, according to the magneto-optic disk device, for example, the second musical composition and the fourth musical composition are intended to erase, in respect of designating slots in correspondence with parts P2 and P4 by pointers (P-TNO1, PTNO2, . . . ) until then, slots in each of which start address, end address and link pointer are recorded in the recordable region designated by P-FRA, are successively searched based on the link pointer and are successively connected to the final slot. The connecting operation is realized by having the link pointer of the final slot of the recordable region designate the slots controlling the second musical composition and the fourth musical composition.

According to the connecting operation, the link pointer of the final slot searched by LINK-P, is recorded with Null data, the Null data is rewritten to designate the slot in correspondence with the erased second musical composition, the link pointer of the slot corresponding to the second musical composition is rewritten to designate the slot in correspondence with the fourth musical composition that is intended to erase and the link pointer of the slot in correspondence with the fourth musical composition is recorded with the Null data.

The recording of the Null data in the link pointer signifies that no continuous link slot is present.

In this way, according to the magneto-optic disk device, the audio data is recorded in the unit of cluster and the recorded audio data is controlled by UTOC by which even if processings of recording and erasing are repeated, UTOC is rewritten in correspondence with the processings, the continuous audio data is discretely recorded and the discretely recorded audio data is reproduced. By that amount, the program region of the magneto-optic disk can effectively be used.

By contrast, in editing, the magneto-optic disk device changes the play order of the audio data recorded in the magneto-optic disk by rewriting pointers (P-TNO1, P-TNO2, . . . ) or by rewriting the slots respectively designated by the pointers (P-TNO1, P-TNO2, . . . ).

As shown by FIGS. 5A and 5B, for example, when P1 of a first musical composition of FIG. 5A is divided in two by which a processing of dividing the first musical composition into two musical compositions is carried out, the end address is changed from S2 to S3 without changing the start address of the slot designated by P-TNO1. The link pointer is recorded with the Null data since there is no successive slot.

Further, the start address of the slot designated by P-TNO2 is changed from S2 to S3 and also, the end address is changed from S4 to S3. The link pointer is recorded with the Null data since there is no successive slot.

In FIG. 5A, only the two musical compositions are recorded and therefore, P-TNO3 does not designate a specific slot. However, according to FIG. 5B showing a state after the division processing, P-TNO3 is edited to designate a new slot whereby S2 is recorded to the start address of the slot designated by P-TNO3 and S4 is recorded to the end address thereof. The link pointer is recorded with the Null data since there is no successive slot.

The division processing of a musical composition can be carried out by performing the edition on U-TOC as described above.

Incidentally, the start and the end address of the slot designated by P-TNO2 are equal to the start address and the end address of the third musical composition after edition and therefore, the designation of destination by P-TNO3 may be edited to designate the slot designated by P-TNO2, P-TNO2 may be edited to designate a new slot, S3 may be recorded as the start address of a slot newly designated by P-TNO2 and S2 may be recorded as the end address thereof.

Incidentally, in this case, the start address of the slot designated by P-TNO1 is not naturally changed and the end address is naturally changed from S2 to S3.

In this way, according to the magneto-optic disk device, the audio data can easily be edited in the unit of sound group by the simple processing of rewriting UTOC.

The editing processing which can be executed by controlling by UTOC in this way, is a processing for rearranging audio data of two channels comprising right and left channels simultaneously in the unit of sound group. Thereby, when the editing processing is performed between channels in the conventional magneto-optic disk device, it is necessary to edit reproduced audio data by decompressing it in respect of a time axis and thereafter to rerecord it.

It seems that when the editing processing between channels can simply be executed as in the editing processing that is executed under control of UTOC, the easiness of use of this kind of the magneto-optic disk device can further be promoted. Also, it seems to be convenient when the audio data can be edited by multi channels by increasing a number of channels that can be edited.

The present invention has been carried out in consideration of the above-described points and it is an object thereof to provide an editing device capable of simply editing audio signals among a plurality of channels.

SUMMARY OF THE INVENTION

In order to resolve such a problem, according to the present invention, there is provided an editing device including storing means for forming a plurality of channels by successively allocating blocks of audio data circulatingly and storing audio data of a pre edit portion reproduced by reproducing means, audio signal modifying means for modifying the audio data at the pre edit portion stored to the storing means and recording means for recording the audio data at the pre edit portion stored to the storing means to a post edit portion.

When the reproduced audio data at the pre edit portion is stored to the storing means and the audio data is modified by the audio signal modifying means, the audio data can be edited among the plurality of channels by the fabrication. Accordingly, the audio data can simply be edited among the plurality of channels recorded on a record medium by recording the audio data at the pre edit portion stored to the storing means.

In view of the above points, according to the present invention, there is provided an editing device in which on a record medium having a unit of writing data determined to be a predetermined length, a plurality of channel data having a unit channel data length shorter than the unit length of writing data are recorded by being subjected to time division multiplexing and an editing processing is performed with respect to predetermined channels of the plurality of channels, the editing device including, an operation key for designating an editing range of a first specific channel data that is a pre edit portion designated by a user and an editing position of a second specific channel data that is a post edit portion designated by the user, a reproducer for reproducing the plurality of channel data in respect of the editing range from the record medium based on the editing range of the pre edit portion designated by the operation key and reproducing the plurality of channel data in respect of the post edit portion from the record medium based on the designated editing position at the post edit portion designated by the operating means, a first memory for storing the plurality of channel data at the pre edit portion reproduced by the reproducer at each of the unit of writing data, a second memory for storing the plurality of channel data at the post edit portion reproduced by the reproducer at each of the unit of writing data, an overwriter for reading the first specific channel data constituting the pre edit portion designated by the user from the first memory and overwriting the read first specific channel data from a position corresponding to the second specific channel data at the post edit portion stored by the second memory, and a recorder for recording again the plurality of channel data stored to the second memory to a portion on the record medium situated before the editing processing after the specific channel data has been overwritten to the second memory.

Further, according to the present invention, there is provided an editing device in which on a record medium having a unit of writing data determined to be a predetermined length, a plurality of channel data having a unit channel data length shorter than the unit length of writing data are recorded by being subjected to time division multiplexing and an editing processing is performed with respect to predetermined channels in the plurality of channels, the editing device including, an operation key for designating an editing range of a specific channel data designated by a user, a reproducer for reproducing the plurality of channel data in respect of the editing range from the record medium based on the editing range designated by the operation key, a memory for storing the plurality of channel data which have been reproduced by the reproducer at each of the unit of writing data, an eraser for erasing the specific channel data having the editing range designated by a user from the memory, and a recorder for recording again the plurality of channel data stored to the memory to a portion on the record medium situated before the editing processing after the specific channel data has been erased on the memory.

BRIEF DESCRIPTION OF THE DRAWINGS

FIG. 3 is a schematic view showing U-TOC data that is control data recorded on the record medium applied to the present invention;

FIG. 7 is an outlook view of an UNDO/REDO key installed on the recording device;

FIG. 8 is a block diagram for explaining time division multiplex recording and multiplex reproducing in a 4-channel recording and reproducing device applied to the present invention;

FIG. 9A is a schematic view showing a first channel in four channels inputted to a recording device according to the present invention;

FIG. 9B is a schematic view showing a second channel in the four channels inputted to the recording device according to the present invention;

FIG. 9C is a schematic view showing a third channel in the four channels inputted to the recording device according to the present invention;

FIG. 9D is a schematic view showing a fourth channel in the four channels inputted to the recording device according to the present invention;

FIG. 9E is a schematic view performing time division multiplexing on input signal of the four channels;

FIG. 9F is a schematic view in which the time division multiplex signal is made to correspond to the sound group explained in FIG. 1C;

FIG. 9G is a schematic view for explaining the sector that is the data structure recorded on the record medium applied to the present invention;

FIG. 9H is a schematic view for explaining the cluster which is the unit of writing data recorded on the record medium applied to the present invention;

FIG. 10A is a schematic view showing a first channel in two channels inputted to a recording device according to the present invention;

FIG. 10B is a schematic view showing a second channel in the two channels inputted to the recording device according to the present invention;

FIG. 10C is a schematic view performing time division multiplexing on input signal of the two channels;

FIG. 10D is a schematic view in which the time division multiplex signal is made to correspond to the sound group explained in FIG. 1C;

FIG. 10E is a schematic view for explaining the sector that is the data structure recorded on the record medium applied to the present invention;

FIG. 10F is a schematic view for explaining the cluster that is the unit of writing data on the record medium applied to the present invention;

FIG. 23A is a schematic view for explaining a cluster that is a unit of writing data recorded on the record medium applied to the present invention;

FIG. 23B is a schematic view for explaining a sector that is a data structure recorded on the record medium applied to the present invention;

FIG. 23C is a schematic view for explaining a sound group that is a data structure recorded on the record medium applied to the present invention;

FIG. 23D is a schematic view for explaining 4 channel data that is a data structure recorded on the record medium applied to the present invention;

FIG. 23E is a schematic view schematically rearranging the 4 channel data time-sequentially and continuously;

DESCRIPTION OF THE PREFERRED EMBODIMENTS

A detailed explanation will be given of embodiments of the present invention pertinently in reference to the drawings as follows.

(1) Total constitution

Figure 6:
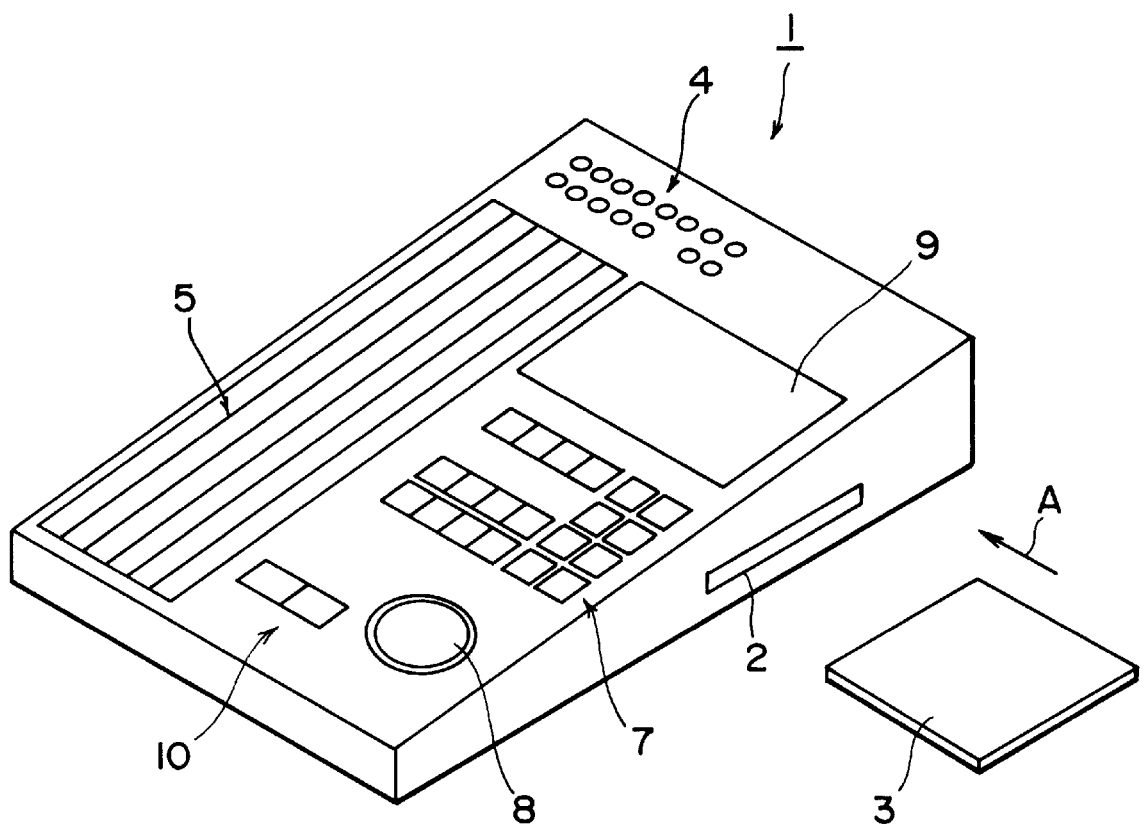
FIG. 6 is an outlook view of a recording device applied to the present invention.

FIG. 6 is a perspective view showing a magneto-optic disk device according to an embodiment of the present invention. According to a magneto-optic disk device 1, as shown by an arrow mark A, a disk cassette 3 is inserted from a disk insertion port 2 arranged at a side face, audio signals are recorded on a magneto-optic disk held by the disk cassette 3 and audio signals recorded on the magneto-optic disk are edited and reproduced.

Here, according to the magneto-optic disk applied to the magneto-optic disk device 1, a pre-groove for guiding a laser beam is formed to meander on an information record face, the disk can be driven to rotate at a predetermined rotational speed and the address of a laser beam irradiating position can be detected with the frequency of meandering as a reference. Further, the information record face is concentrically divided and the outer peripheral side is allocated to a program region for recording audio signals and the inner peripheral side is allocated to a control region. According to the magneto-optic disk, control data constituted by P-TOC (Pre-mastered Table of Content) and U-TOC for controlling the program region is recorded in the control region. The magneto-optic disk is formed to be able to make an access to PTOC region with data of UTOC as a reference and UTOC is formed by a format described above in reference to FIG. 3.

Further, the top face of the magneto-optic disk device 1 is set as an operation panel, at least 1 channel of audio signals are inputted via a connector 4 arranged at the upper portion of the operation panel and are recorded in the magneto-optic disk and the recorded audio signal is outputted. In the magneto-optic disk device 1, master operators 5 are arranged for the respective channels on the left side of the operation panel and sound volume or the like can be adjusted by operating the operators 5.

According to the magneto-optic disk device 1, various operators 7 are arranged contiguous to the operators 5, a jog dial 8 is arranged on the lower side of the operators 7 and a display panel 9 is arranged at the upper portion of the operators 7 by which, for example, an in point, an out point and the like can be set by operating the jog dial 8 while confirming the display of the display panel 9. Operators 10 for reproducing or the like are arranged contiguous to the jog dial 8 and audio signals can be recorded and reproduced by operating the operators 10.

According to the magneto-optic disk device 1, one of the operators 7 used in setting an in point or the like in this way, is set to an operator of Undo and Redo and processings of Undo and Redo are executed by repeatedly pushing the operator.

FIG. 7 is a plane view showing the operator 7A of Undo and Redo where a display of "UNDO" indicating the function of the operator is formed on the upper face of the operator 7A that is pushed by finger and a window 7B is formed at the corner portion on the left upper side. The window 7B is illuminated in green by light emitting diode arranged at the inside thereof and the magneto-optic disk device 1 illuminates the window 7B as necessary to be able to transfer various information to a user.

FIG. 8 is a block diagram showing the constitution of a digital signal processing unit of the magneto-optic disk device 1. According to the magneto-optic disk device 1, an analog to digital conversion circuit (A/D) 12 subjects audio signals SA1 through SA4 of a maximum of 4 channels inputted from the connector 4 to an analog to digital conversion processing by a predetermined sampling frequency by which digital audio signals are outputted.

A data compression circuit 13 blocks the digital audio signals outputted from the analog to digital conversion circuit 12 by subjecting them to time division at the frequency of 11.61 msec and compresses the digital audio signals by data compression by the unit of each block.

A time correction circuit 14 converts the digital audio signals outputted from the data compression circuit 13 into one digital audio signal DA1 and outputs it to a data bus BUS by being controlled by a system control circuit 15 in respect of the operation.

An explanation will be given of the procedure of blocking the audio signals inputted via 4 channels by the unit of one cluster as follows. As shown by FIGS. 9A through 9H, in recording the audio signals SA1 through SA4 of 4 channels inputted from the connector 4, the time correction circuit 14 subjects the respective blocks at the frequency of 11.61 msec to time division multiplexing successively and circulatingly whereby the digital audio signal DA1 as shown by FIG. 9E is formed.

As shown by FIG. 9F, the magneto-optic disk device 1 forms one sound group by continuous two blocks of the digital audio signal DA1 and allocates continuous 11 sound groups to 2 sectors. Further, as shown by FIG. 9H, sets of three link sectors L and one sub sector S are added before and after continuous 32 sectors whereby 1 cluster is formed. Incidentally, in this case a sound frame is formed by 22 sound groups.

By contrast, as shown by FIGS. 10A through 10F, in recording audio signals SA1 and SA2 of 2 channels, the time correction circuit 14 similarly subjects the respective blocks at the period of 11.61 msec to time division multiplexing successively and circulatingly by which the digital audio signal DA1 is formed.

An explanation will be given of the procedure of blocking the audio signals inputted via 2 channels by the unit of one cluster.

As shown by FIG. 10D, similar to the case of 4 channels, the magneto-optic disk device 1 forms 1 sound group by continuous 2 blocks, and as shown by FIG. 10E, allocates 11 sound groups to 2 sectors. As shown by FIG. 10F, sets of link sectors L and one sub sector S are added to before and after continuous 32 sectors by which 1 cluster is formed. Incidentally, in this case a sound frame is formed by 11 sound groups as in the case of the stereo described in reference to FIGS. 1A through 1D.

As shown by FIGS. 11A through 11D, in recording an audio signal SA1 of 1 channel, the time correction circuit 14 forms the digital audio signal DA1 by successively and timewisely arranging the respective blocks at the period of 11.61 msec.

Figures 11A, 11B, 11C, 11D, 12A, 12B:
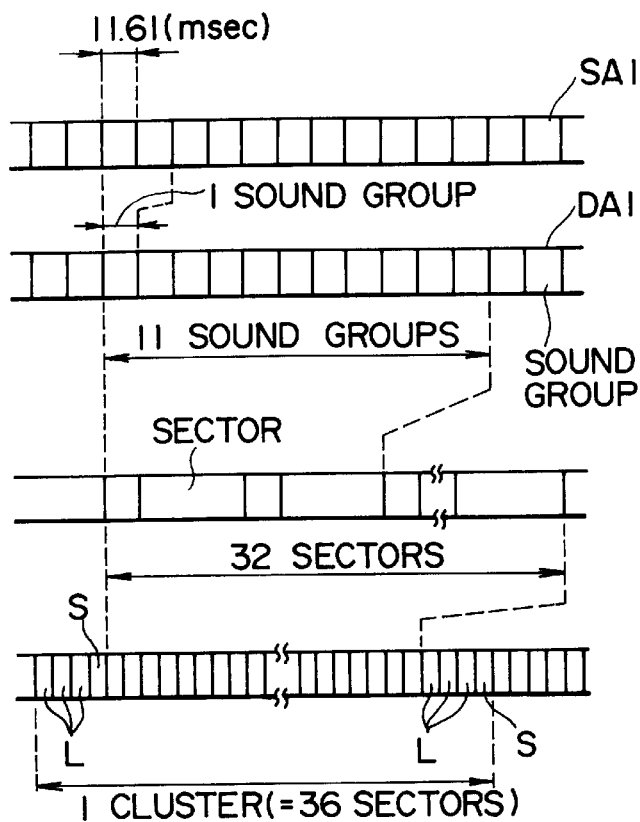
FIG. 11A is a schematic view performing time division multiplexing on input signals of one channel.
FIG. 11B is a schematic view in which the time division multiplex signal is made to correspond to the sound group explained in FIG. 1C.
FIG. 11C is a schematic view for explaining the sector that is the data structure recorded on the record medium applied to the present invention.
FIG. 11D is a schematic view for explaining the cluster that is the unit of writing data recorded on the record medium applied to the present invention.
FIG. 12A is a schematic view of a program of two musical compositions recorded on the record medium applied to the present invention.
FIG. 12B is a schematic view after performing a copying processing on the first one of the two musical compositions in the program.

Also in this case, similar to the case of 4 channels, the magneto-optic disk device 1 forms 1 sound group by continuous 2 blocks and allocates 11 sound groups to 2 sectors as shown by FIG. 11C. Further, sets of link sectors L and one sub sector S are added to before and after continuous 32 sectors by which 1 cluster is formed. Also in this case, similar to the case of the stereo described above in reference to FIGS. 1A through 1D, a sound frame is formed by 11 sound groups. Incidentally, in respect of the number of channels, mode data (TRACK MODE) allocated to the respective slots of UTOC are set by the system control circuit 15 and are recorded on the magneto-optic disk.

By contrast, in the reproducing operation, the time correction circuit 14 demodulates the digital audio signal DA1 successively inputted from the data bus BUS into the original digital audio signals that is an operation reverse to that in recording in accordance with the format of audio signal recorded on the magneto-optic disk, and outputs them under the control of the system control circuit 15.

A data decompression circuit 18 decompresses the digital audio signals outputted from and compressed by the time correction circuit 14 in the reproducing operation, which is an operation reverse to that of the data compression circuit 13. A digital to analog conversion circuit (D/A) 19 subjects the digital audio signal outputted from the data decompression circuit 18 to a digital to analog conversion processing and outputs the audio signals SA1 through SA4.

A memory 20 is constituted by a memory circuit having a large capacity that is operated under the control of the memory control circuit 21 and inputs and holds the digital audio signal DA1 outputted from the time correction circuit 14 via the data bus BUS in the recording operation. Further, the memory 20 stores the link sectors L, the sub sectors S, the headers of the respective sectors, cluster addresses and the like by a memory control circuit 21 by which record data having the above-described cluster structure is formed by adding these data to the digital audio signal DA1 as described above in reference to FIGS. 9A through 9H, FIGS. 10A through 10F and FIGS. 11A through 11D. The memory 20 outputs the record data to the data bus BUS by the unit of cluster at timings in synchronism with the rotation of the magneto-optic disk.

In the reproducing operation, the memory 20 inputs decoded data outputted from a signal processing circuit 23 via the data bus BUS by the unit of cluster and temporarily stores it. Further, the digital audio signal DA1 is outputted by removing extra data such as headers and the like from the decoded data.

In the editing operation, the memory 20 inputs the decoded data outputted from the signal processing circuit 23 by the unit of cluster and temporarily stores it under the control of the memory control circuit 21. Further, the temporarily stored decoded data is modified by switching the addresses by the unit of blocks of the digital audio signal DA1 and updating it by data outputted from the memory control circuit 21 in accordance with the content of the editing processing. Further, the memory 20 outputs the temporarily stored decoded data to the signal processing circuit 23 via the data bus BUS.

A disk unit 22 drives to rotate the magneto-optic disk contained in the disk cassette 3 and irradiates a laser beam by an optical pickup under the state. Further, the disk unit 22 receives return light of the laser beam by the optical pickup and drives to rotate the magneto-optic disk at a predetermined rotational speed in accordance with the received light result with the pre-groove of the magneto-optic disk as a reference and detects the address of the laser beam irradiating position.

The disk unit 22 performs a tracking control and a focusing control with the received result of return light as a reference and makes the optical pickup seek the recording and reproducing position designated by the system control circuit 15 with the address of the laser beam irradiating position as a reference. By the seeking operation, the disk unit 22 makes an access to PTOC and UTOC in loading and discharging the magneto-optic disk and makes an access to the program region in recording, reproducing and editing.

The disk unit 22 forms a reproducing signal the signal level of which is changed in accordance with a change in the deflected face for deflecting the return light and forms a binarized signal from the reproducing signal. Further, the disk unit 22 forms reproduce clocks from the binarized signals and forms reproduce data by successively latching the binarized signals by the reproduce clocks.

In the recording operation, the disk unit 22 intermittently makes rise the amount of light of the laser beam at the recording and reproducing position designated by the system control circuit 15. Under the state, the disk unit 22 drives a modulating coil by modulation data outputted from the signal processing circuit 23 and applies a modulated magnetic field formed by the modulating coil at the laser beam irradiation position. In this way, the disk unit 22 records the modulated data by applying the method of thermomagnetic recording.

In the editing operation, the disk unit 22 repeats the above-described processing in the reproducing operation and the processing in the recording operation as necessary, by which the reproduced data is outputted to the signal processing circuit 23 and the modulation data outputted from the signal processing circuit 23 is recorded to the magneto-optic disk.

After decoding the reproduced data outputted from the disk unit 22, the signal processing circuit 23 performs an error correction processing by which data of PTOC and UTOC and demodulation data are formed from the reproduced data and outputted to the data bus BUS. By contrast, in the recording operation, the signal processing circuit 23 adds an error correction code to the recorded data outputted to the data bus BUS thereafter, performs an encoding processing by which the modulation data is formed and outputted to the disk unit 22. Further, in the editing operation, the above-described processing in the reproducing operation and the processing in the recording operation are repeated as necessary, by which the decoded data is outputted to the memory 20 and the modulation data is formed from the recorded data outputted from the memory 20 and outputted.

In loading the magneto-optic disk, a TOC memory 24 inputs and holds the data of PTOC and UTOC outputted from the signal processing circuit 23 and outputs the held data to the system control circuit 15 as necessary. Further, in the recording operation and editing operation, the held data is outputted to the system control circuit 15 at request from the system control circuit 15 and the held data is updated. Further, the TOC memory 24 outputs the held data of UTOC to the signal processing circuit 23 in discharging the magneto-optic disk and updates UTOC of the magneto-optic disk by the data of UTOC.

The system control circuit 15 is constituted by a microcomputer for controlling the operation of a total of the magneto-optic disk device 1, switches the total in accordance with the operation of the respective operators 5, 7, 8 and 10 and switches the display of the display panel 9.

When the disk cassette is loaded, the system control circuit 15 loads the data of PTOC to the TOC memory 24 by driving the disk unit 22. Further, the disk unit 22 is driven in accordance with the data of PTOC loaded to the TOC memory 24 and the successive data of UTOC is loaded to the TOC memory 24.

When the record mode is set by operating the operators under the state, slots are successively searched by pointer (P-FRA) of UTOC, a start address and an end address of a recordable region are successively detected and the disk unit 22 is driven by the start address and the end address. By setting the operation of the time correction circuit 14 and the like to the operation mode in the recording operation, the system control circuit 15 makes an access successively to the recordable region of the magneto-optic disk and records the successively inputted audio signal to the magneto-optic disk. In this case, the system control circuit 15 displays a recording time period, a remaining recordable time period and the like by driving the display panel 9.

Furthermore, the system control circuit 15 updates the data of UTOC stored in the TOC memory 24 when the recording operation is finished with respect to one musical composition of the audio signal. That is, with respect to parts recording the one musical composition of the audio signal, pointers (P-TNO1, ..., P-TNO255) and corresponding slots are updated by which the one musical composition of the audio signal is registered to UTOC. Further, the pointer (P-FRA) designating the recordable range is updated by which the parts recording the audio signal is deleted from the recordable range.

By contrast, when the reproducing mode is set, the slots designated by pointers (P-TNO1, ..., P-TNO255) are successively searched, the start addresses and the end addresses of the successively corresponding slots are detected and the disk unit 22 is driven by the detected addresses. Next, the system control circuit 15 sets the operation of the time correction circuit 14 and the like to the operation mode in the reproducing operation by which the audio signals recorded to the magneto-optic disk are successively reproduced and outputted to an outside device.

At this moment, the system control circuit 15 displays the name of the reproduced musical composition, the number of the musical composition, the reproducing time period and the like on the display panel 9 in accordance with the content recorded to the predetermined UTOC by data of UTOC stored in the TOC memory 24 and the musical composition and the channel designated by a user are selectively reproduced.

The system control circuit 15 receives setting of editing points such as in points, out points and the like by the operation of the jog dial 8 and the operation of the operators 7 by a user and when the reproduction in accordance with the editing point is designated, the audio signals designated by the editing point is selectively reproduced.

(1-1) Editing processing

When a user selects the operation mode of editing, the system control circuit 15 executes the editing processing by the unit of the musical composition, the editing operation with respect to a portion of the musical composition and the editing operation among channels in accordance with the operation of the user.

The editing processing by the unit of the musical composition is a so-called UTOC editing processing executed by the unit of the pointers (P-TNO1, ..., P-TNO255) of UTOC and is executed when the user designates the musical composition and selects the mode of editing. In the editing operation by the unit of the musical composition, the system control circuit 15 executes processings of copying, moving, exchanging, erasing, combining or dividing in accordance with the selecting operation of the user.

As shown by FIGS. 12A and 12B, the copying processing is a processing for copying the musical composition selected by the user to the recordable region of the magneto-optic disk and when the musical composition is designated, the system control circuit 15 makes an access to the TOC memory 24 and detects the start address S1 and the end address E1 of a copied portion by the corresponding pointer (P-TNO1). Further, the system control circuit 15 drives the disk unit 22 with the start address S1 and the end address E1 as references, reproduces the magneto-optic disk by the unit of cluster in a range storable to the memory 20 and stores the demodulation data obtained from the signal processing circuit 23 to the memory 20.

As shown by FIG. 12B, the system control circuit 15 detects the recordable region based on the pointer (P-FRA) and records the decompression data held by the memory 20 to a copying portion with the address S3 at the copying portion as a reference. The system control circuit 15 repeats the reproducing and recording processings with respect to the musical composition designated by the user and copies a first musical composition as a third musical composition in this case. The repeating operation of the reproducing and recording processings is not necessary when the capacity of the memory 20 is sufficiently large.

Successively, the system control circuit 15 makes an access to the TOC memory 24 and registers the start address S3 and the end address E3 of the third musical composition to the slots designated by the pointer (P-TNO3).

Figure 13A:
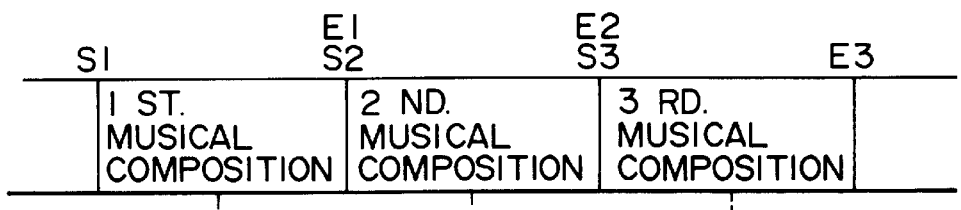
FIG. 13A is a schematic view of a program of three musical compositions recorded on the record medium applied to the present invention.
Figure 13B:
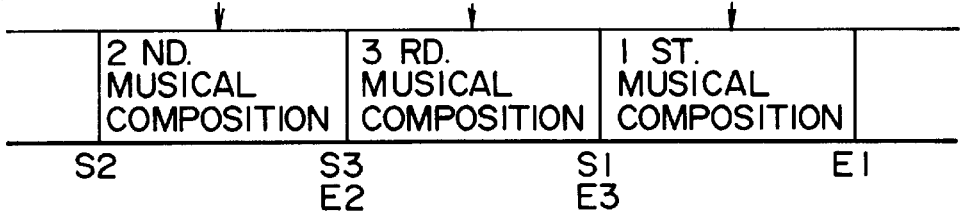
FIG. 13B is a schematic view after performing a moving processing on the program of the three musical compositions.

Hereinafter, the moving processing of the musical composition is shown in FIGS. 13A and 13B. The moving processing is a processing for moving the position of the designated musical composition and when the musical composition is designated, the system control circuit 15 makes an access to the TOC memory 24 and rewrites the addresses of the parts designated by the pointers (P-TNO X:(X=1–255)) of the designated musical compositions. That is, when a first, a second and a third slots are designated successively by the first, the second and the third pointers P-TNO1, P-TNO2 and P-TNO3, the addresses are rewritten to designate the second, the third and the first slots by the first, the second and the third pointers P-TNO1, P-TNO2 and P-TNO3 and the order of the musical compositions is switched. Here, caution is required to the fact that the start addresses, the end addresses and the link data constituting contents of the slots are not rewritten but the slot numbers recorded in P-TNO are rewritten.

Figure 14A:
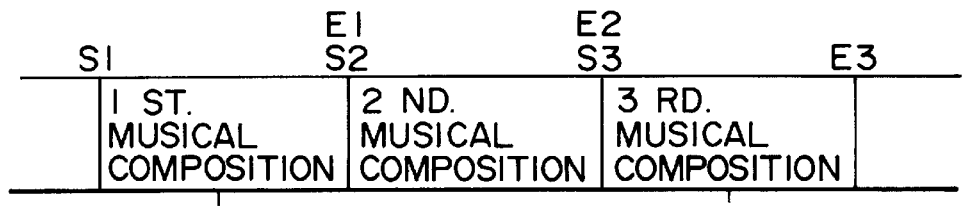
FIG. 14A is a schematic view of a program of three musical compositions recorded on the record medium applied to the present invention.
Figure 14B:
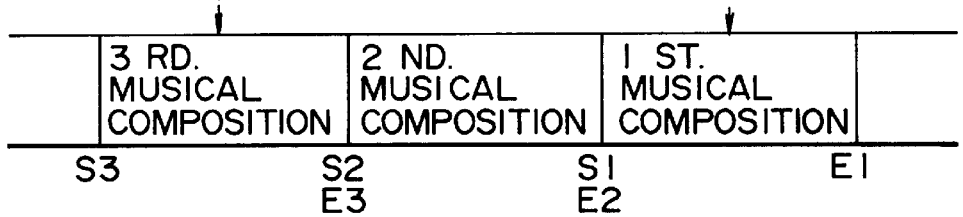
FIG. 14B is a schematic view after performing an exchanging processing for exchanging a first one and a third one of the three musical compositions in the program.

Hereinafter, as shown by FIGS. 14A and 14B, the exchanging processing is a processing for exchanging the designated musical compositions and the system control circuit 15 exchanges the order of the musical compositions by rewriting addresses of parts designated by the pointers (P-TNO X:(X=1–255)) with respect to the designated musical compositions similar to the case of the moving processing.

In the case of FIGS. 14A and 14B, the slot number designated by P-TNO1 and the slot number designated by P-TNO3 are exchanged and rewritten.

Figure 15A:
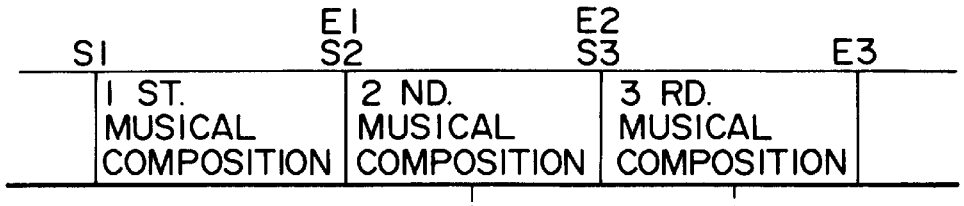
FIG. 15A is a schematic view of a program of three musical compositions recorded on the record medium applied to the present invention.
Figure 15B:
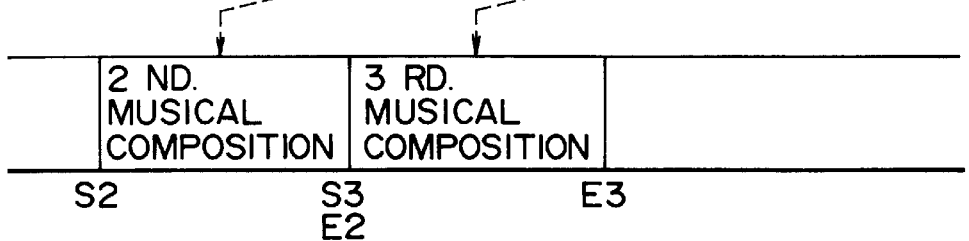
FIG. 15B is a schematic view after performing erasing processing with respect to a first one of the three musical compositions in the program.

As shown by FIGS. 15A and 15B, the erasing processing is a processing for erasing the designated musical composition and the system control circuit 15 executes a processing reverse to the updating processing of the TOC memory 24 that is executed in the copying operation with respect to the designated musical composition.

That is, the system control circuit 15 makes an access to the TOC memory 24 and releases the designation of the part by the pointer (P-TNO1, . . . , P-TNO255) designating the part (comprising the start address S1 and the end address E1) of the fist musical composition and adds the slot comprising the start address S1 and the end address E1 to the slot designated by the pointer (P-FRA) of the recordable region.

Figure 16A:
FIG. 16A is a schematic view of a program of three musical compositions recorded on the record medium applied to the present invention.
Figure 16B:
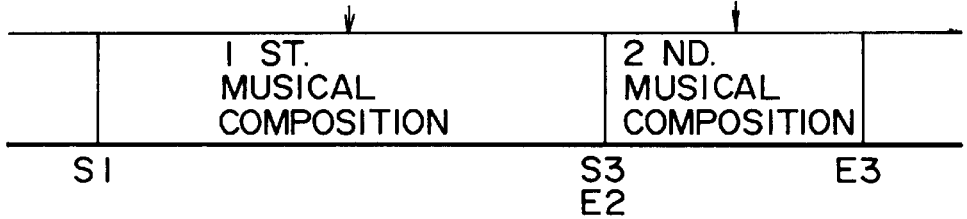
FIG. 16B is a schematic view after performing a combining processing for combining a first one and a second one of the three musical compositions in the program.

As shown by FIGS. 16A and 16B, the combining processing is a processing for combining the designated musical compositions and when the first musical composition and the second musical composition are designated, the system control circuit 15 makes an access to the TOC memory 24 and sets the address designating the slot of the second musical composition to the link pointer LINK-P of the slot designated by the pointer P-TNO1 of the first musical composition. The pointer P-TNO2 of the second musical composition is updated such that the slot designated by P-TNO3 is designated.

Further, the slot is prevented from being designated by recording the Null data to P-TNO3.

Figure 17A:
FIG. 17A is a schematic view of a program of three musical compositions recorded on the record medium applied to the present invention.
Figure 17B:
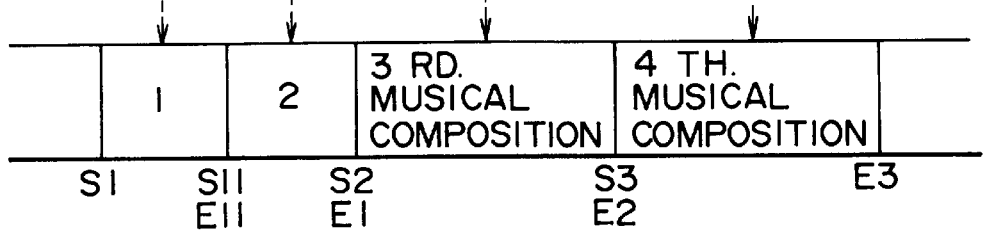
FIG. 17B is a schematic view after performing a dividing processing with respect to a first one of the three musical compositions in the program.

As shown by FIGS. 17A and 17B, the dividing processing is a processing for dividing one musical composition into a plurality of musical compositions and when the first musical composition is designated, the system control circuit 15 makes an access to the TOC memory 24 and updates the address of the inputted editing point as an end address E11 by operating the jog dial 8 with respect to the slot of the first musical composition.

Further, the slot number recorded to the pointer P-TNO3 corresponding to the third musical composition is copied to P-TNO4 and the slot number recorded to the pointer P-TNO2 corresponding to the second musical composition is copied to P-TNO3. Further, an empty slot designated by P-EMPTY is designated to the pointer P-TNO2 corresponding to the second musical composition by which S11 successive to E11 formed by the dividing processing, is recorded as the start address of a new slot designated by the pointer P-TNO2 and E1 is recorded to the end address. Although an explanation has been given of the above-described processings with respect to various editing processings by the unit of one musical composition, the various editing processings can be performed with respect to a finer portion in the musical composition.

The above-described editing processing with respect to a portion of the musical composition is a so-called UTOC editing processing for editing audio signals by the unit of sound group comprising the unit of recording in the magneto-optic disk. The processing is executed when the mode of editing is selected by a user by setting in points IN, out points OUT and the like by the unit of sound group in one musical composition. The system control circuit 15 executes processings of inserting, moving, exchanging or erasing in accordance with the selecting operation of the user.

Figure 18A:
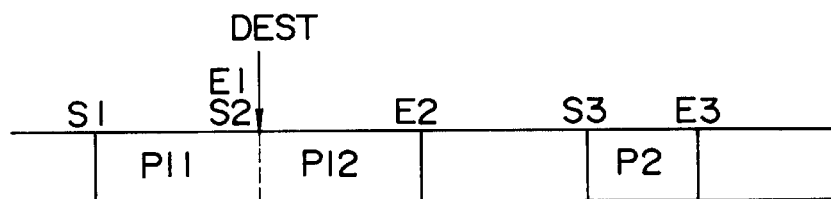
FIG. 18A is a schematic view showing three parts recorded on the record medium applied to the present invention.
Figure 18B:
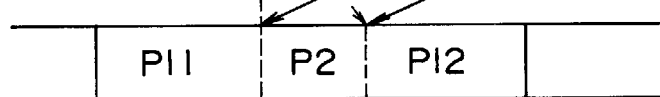
FIG. 18B is a schematic view after performing an inserting processing for inserting a part P2 between two parts P11 and P12 in the three parts.

As shown by FIGS. 18A and 18B, the inserting processing is a processing for inserting a separate and new portion to one musical composition and in this case, the system control circuit 15 previously receives designation of a processing point DEST showing the inserting position by operation the jog dial 8 and records a musical play to be inserted to a recordable area of the magneto-optic disk. The system control circuit 15 previously forms a part P2 in accordance with the musical play recorded in the magneto-optic disk and updates the content of the TOC memory 24 such that a part P1 of one musical composition is divided into two parts P11 and P12 with the processing point DEST as a boundary. Further, the link pointers corresponding to the parts P11 and P2 are updated such that the parts P11, P2 and P12 can successively be searched.

Here, the slot corresponding to the part P11 controls the start address S1 and the end address E1 and the link pointer designates the slot corresponding to the part P2. Further, the slot corresponding to the part P2 controls the start address S3 and the end address E3 and the link pointer designates the slot corresponding to the part P12. Furthermore, the slot corresponding to the part P12 controls the start address S2 and the end address E2 and Null is recorded to the link pointer.

Incidentally, although according to FIG. 18B, P2 seems to be schematically inserted and the part P12 seems to be shifted, actually, they stay physically as they are shown by FIG. 18A and the U-TOC information is simply rewritten as described above.

Figure 19A:
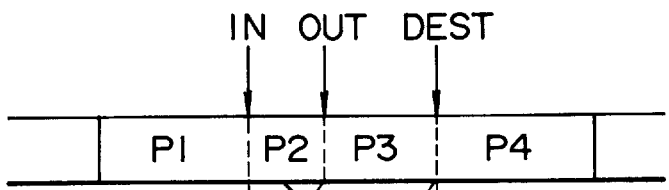
FIG. 19A is a schematic view showing four parts recorded on the record medium applied to the present invention.
Figure 19B:
FIG. 19B is a schematic view after performing a moving processing for moving two parts P2 and P3 in the four parts.

Hereinafter, FIGS. 19A and 19B show schematic views in performing the moving processing.

The moving processing is a processing for moving a portion in one musical composition is cut out and moved in the musical composition and also in this case, the system control circuit 15 previously receives designation of the processing point DEST showing an in point IN, an out point OUT and destination of movement by operating the jog dial 8. The system control circuit 15 divides a part of one musical composition into four parts P1, P2, P3 and P4 with the in point IN, the out point OUT and the processing point DEST as boundaries and the respective parts are registered in the TOC memory 24. Further, the link pointer is set between the respective parts such that the part between the in point IN and the out point OUT can be reproduced successive to the processing point DEST.

Figure 20A:
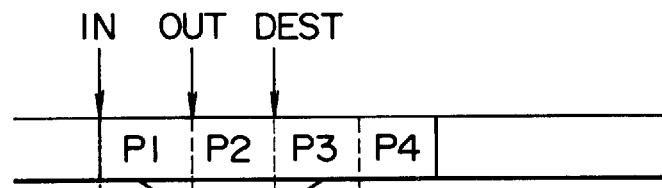
FIG. 20A is a schematic view showing four parts recorded on the record medium applied to the present invention.
Figure 20B:
FIG. 20B is a schematic view after performing an exchanging processing for exchanging two parts P1 and P3 in the four parts.

As shown by FIGS. 20A and 20B, the exchanging processing is a processing for exchanging parts in one musical composition and also in this case, the system control circuit 15 updates the content of the TOC memory 24 and executes the exchanging processing similar to the case of the moving processing.

Figure 21A:
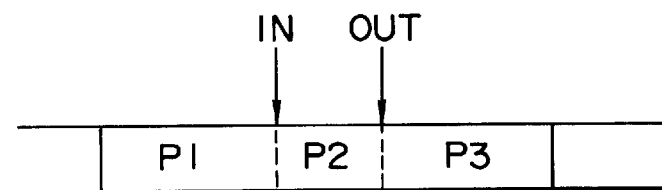
FIG. 21A is a schematic view showing three parts recorded on the record medium applied to the present invention.
Figure 21B:
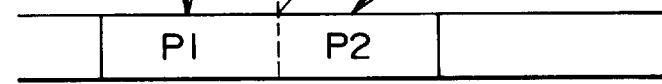
FIG. 21B is a schematic view after performing an erasing processing for erasing a part P2 that is the central one of the three parts.

As shown by FIGS. 21A and 21B, the erasing processing is a processing for erasing one portion in one musical composition and also in this case, the system control circuit 15 previously receives destination of the in point IN and the out point OUT showing an erasing start position and an erasing finish position. The system control circuit 15 divides the part of one musical composition into three parts P1, P2 and P3 with the in point IN and the out point OUT as boundaries, and the respective parts are registered in the TOC memory 24. Further, with respect to the part between the in point IN and the out point OUT, the link pointer of a corresponding socket is set such that the pointer (P-FRA) showing a recordable region can be searched and the link pointer is set between the respective parts P1 and P3 such that the reproducing operation can be carried out by omitting the part between the in point IN and the out point OUT. Although the part P3 is schematically described to be shifted in FIG. 21B, actually, the part P3 stays as it is as shown by FIG. 21A and the part P2 is only registered to P-FRA as a free area.

(1-2) Editing processing among channels

When 4 channels of audio signals are recorded in the magneto-optic disk, the editing processing among channels is an editing processing executed among the audio signals of 4 channels at an interval by the unit of sound group and is executed when the mode of editing is selected by setting by a user in points IN, out points OUT and the like by the unit of sound group in one musical composition or among musical compositions. The editing processing is executed when, for example, musical plays by individual musical instruments are allocated respectively to the channels and parts of the respective musical plays are repeated, exchanged or added to other musical compositions.

When audio signals of 2 channels are recorded to the magneto-optic disk or when audio signals of 1 channel are recorded thereto, the editing processing among the channels is executed similar to the case where the audio signals of 4 channels recorded to the magneto-optic disk are processed.

As shown by FIGS. 9A through 9H, when the audio signals of 4 channels are recorded to the magneto-optic disk, according to the magneto-optic disk device 1, the digital audio signal DA1 is formed by subjecting the audio signals of 4 channels to time division multiplexing and the respective blocks of the digital audio signal DA1 are allocated to sound groups successively and circulatingly. By contrast, when the audio signals of 2 channels are recorded to the magneto-optic disk as shown by FIGS. 10A through 10F, according to the magneto-optic disk 1, the digital audio signal DA1 is formed by subjecting the audio signals of 2 channels to time division multiplexing and the respective blocks of the digital audio signals DA1 are allocated to sound groups successively and circulatingly. Further, when the audio signals of 1 channel are recorded to the magneto-optic disk as shown by FIGS. 11A through 11D, according to the magneto-optic disk device 1, the digital audio signal DA1 is formed by blocking the audio signals of 1 channel by the time division and the respective blocks of the digital audio signal DA1 are allocated to sound groups successively and circulatingly.

The magneto-optic disk device 1 executes the editing processing among channels on the basis of the case where the audio signals of 4 channels are recorded to the magneto-optic disk. Further, when the audio signals of 2 channels or the audio signals of 1 channel are recorded to the magneto-optic disk, similar to the case where the audio signals of 4 channels are recorded to the magneto-optic disk in respect of the digital audio signal DA1 that is subjected to time axis multiplexing or time division, by which easiness of use is promoted.

In respect of the editing processing among channels, the system control circuit 15 executes processings of copying, moving, exchanging or erasing in correspondence with the selecting operation of a user.

As in the above-described explanation in reference to FIGS. 9A through 9H, as shown by FIG. 23A, the compressed audio signals are recorded on the disk by the unit of cluster from the inner periphery of the disk toward the outer periphery thereof.

Figure 1:
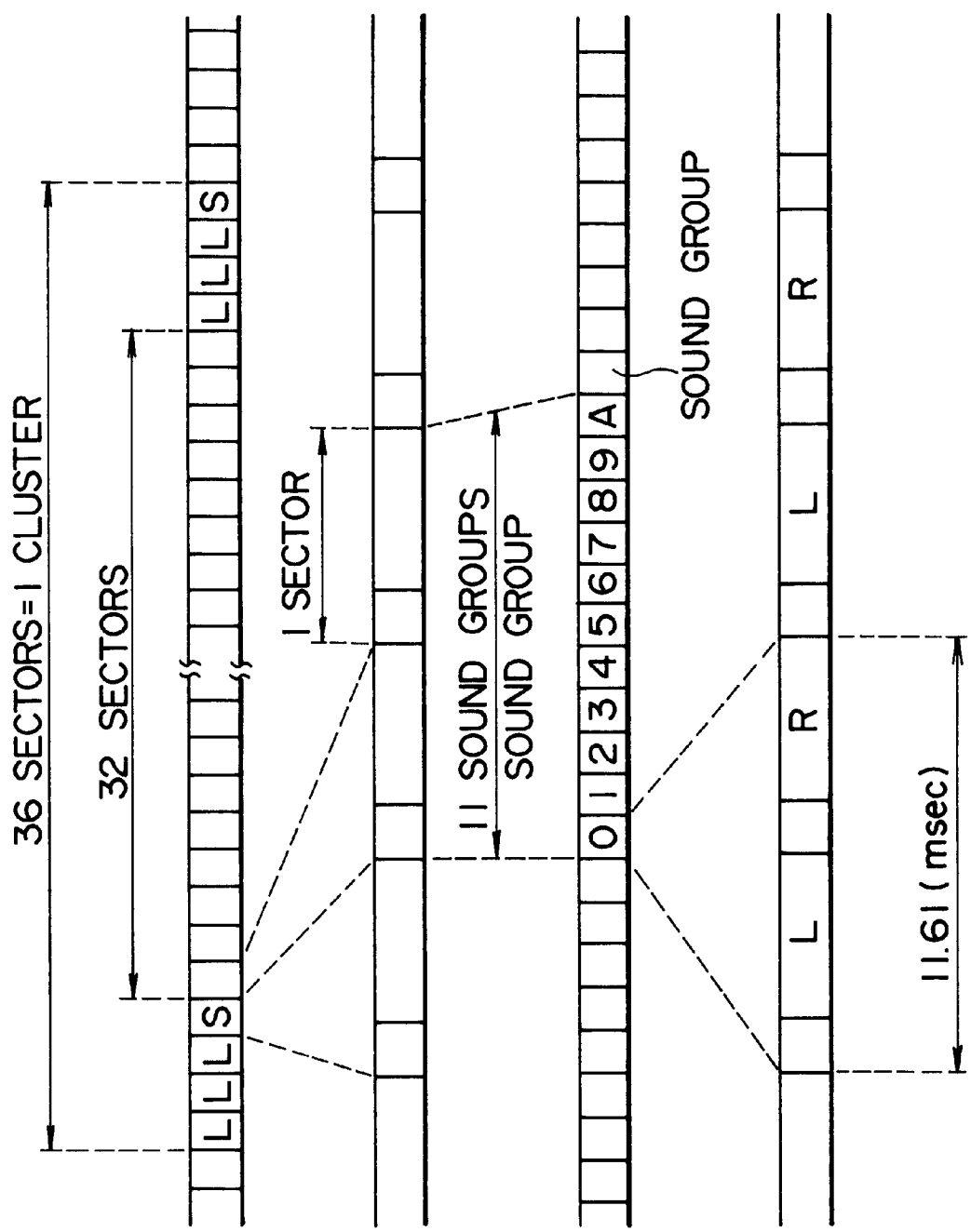
FIG. 1A is a schematic view for explaining a cluster that is a unit of writing data recorded on the record medium that is applied to the present invention.
FIG. 1B is a schematic view for explaining a sector that is a data structure recorded on the record medium applied to the present invention.
FIG. 1C is a schematic view for explaining a sound group that is a data structured recorded on the record medium applied to the present invention.
FIG. 1D is a schematic view for explaining two channel data that is a data structure recorded on the record medium applied to the present invention.
Figure 2:
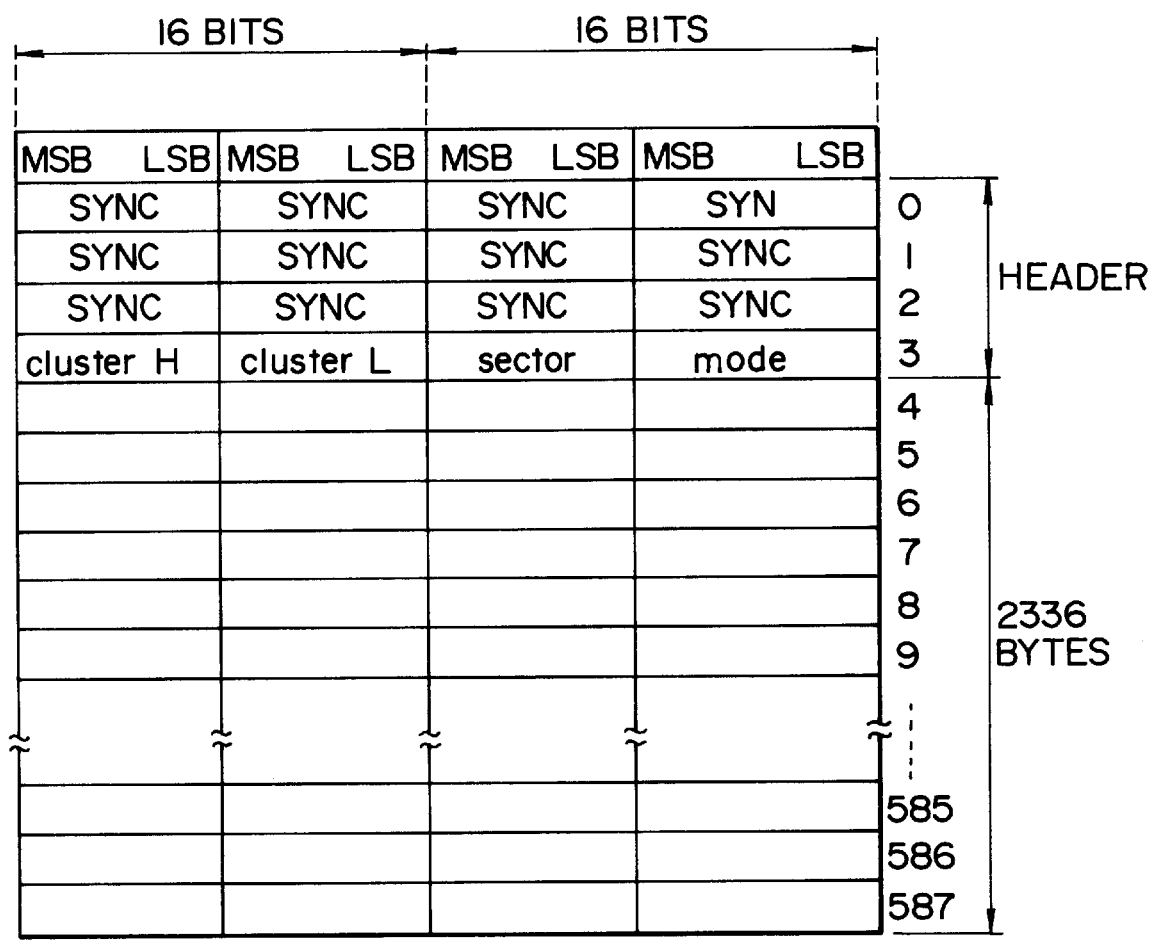
FIG. 2 is a structural view of a sector applied to the present invention.
Figure 4:
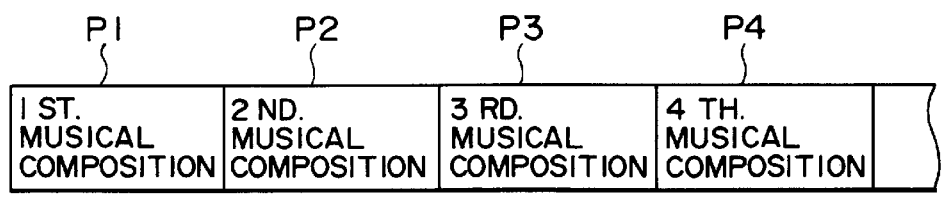
FIG. 4 is a schematic view of a program recorded on the record medium applied to the present invention.
Figure 5A:
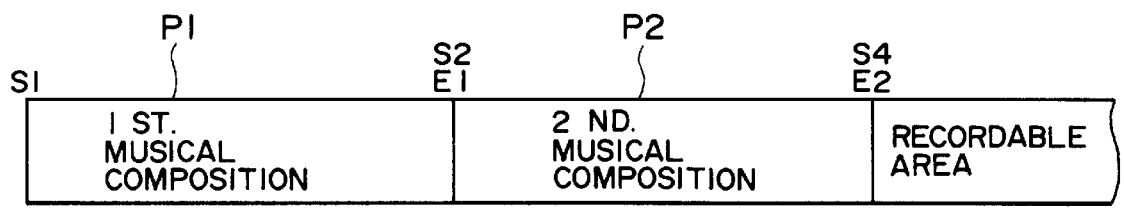
FIG. 5A is a schematic view of a program of two musical compositions recorded on the record medium applied to the present invention.
Figure 5B:
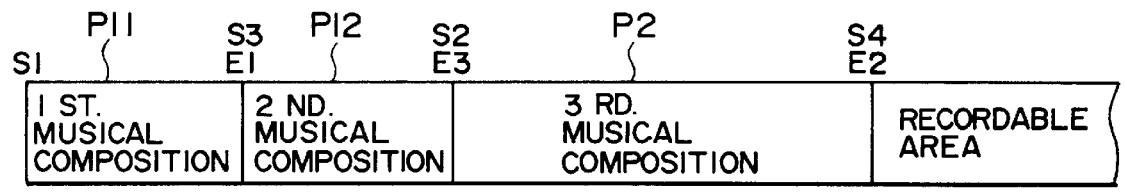
FIG. 5B is a schematic view after performing a division processing on the first one of the two musical compositions in the program.

As shown by FIG. 23B, 1 cluster comprises 36 sectors and front 4 sectors are used for linking areas and a sub data and the compressed main audio data is recorded at 32 sectors thereafter.

As shown by FIG. 23C, 11 sound groups are formed at a pair of 2 sectors and 2 channel data can be recorded to 1 sound group. Now, when 4 channel recording is considered, the data is recorded on the disk in the form shown by FIG. 23D.

Now, sectors allocated to the main audio data in 1 cluster comprise 32 sectors and therefore, data of 32 2 11 (SG) 2=88 per cluster (block per channel) can be recorded.

In order to facilitate the explanation hereinafter, the respective channel data are allocated as data rows in the longitudinal direction as shown by FIG. 23E whereby a drawing of an image as if time-sequentially and continuously reproduced (image of a so-called tape-like record medium) is shown.

Hereinafter, the drawing of FIG. 23E corresponds to FIGS. 24A, 25A, 27A and 28A.

Figure 22:
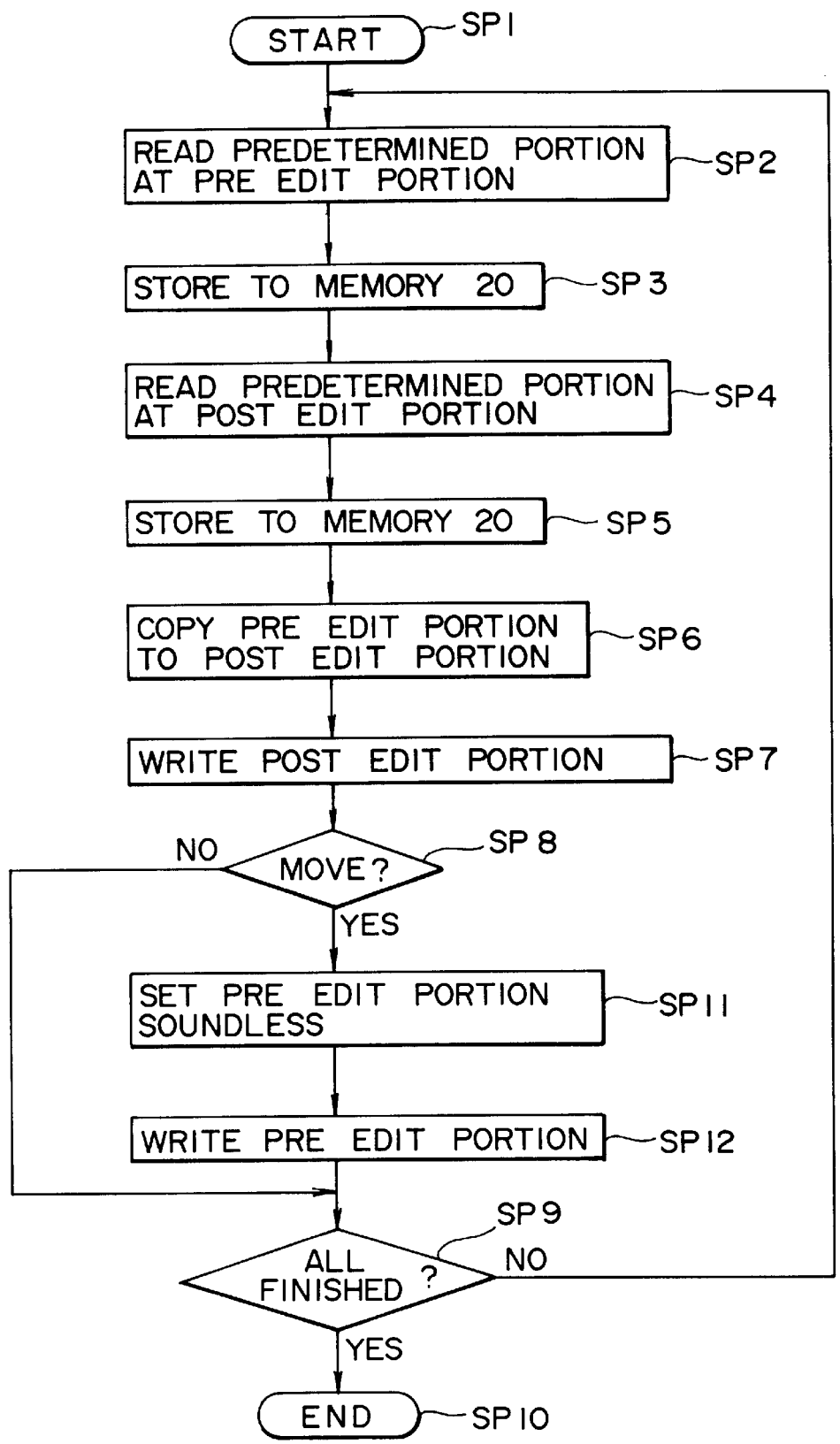
FIG. 22 is a flowchart of an editing processing for moving or copying a portion of one channel data in multi channel data according to the present invention to other channel data.

When a user selects the mode of copying or moving in the editing processing among channels, the system control circuit 15 executes a processing procedure shown by FIG. 22. Incidentally, the copying processing is a processing for copying audio signals between an in point IN and an out point OUT of a channel designated by the user at and after the processing point DEST of the channel designated by the user and the moving processing is a processing for copying audio signals between an in point IN and an out point OUT of a channel designated by the user at and after the processing point DEST of the channel designated by the user and erasing the corresponding channel between the in point IN and the out point OUT.

An explanation will be given of a procedure of performing the copying processing or the moving processing among channels in reference to the flowchart of FIG. 22 and FIGS. 24A through 24D as follows.

A user designates an in point IN that is an editing start point and an out point OUT that is an editing finish point of a channel that is a pre edit portion by using the JOG dial or the like and determines as follows a start point and a finish point of data stored to a memory with a designated edit point as a reference.

When the in point IN that is the editing start point designated by the user, is, for example, at 48-th cluster address, 12-th sector address, 2-th sound group (hereinafter, designated by (48, 12, 2)), as a reference to be stored in a memory of (48, 00, 01), that is, data from 48-th cluster, 0-th sector address, 1-th sound group is reproduced and stored to the memory. This operation is performed since a unit of writing to the memory is the unit of cluster.

Similarly, when the out point OUT that is the editing finish point designated by a user, is, for example, at 49-th cluster address, 11-th sector address, A sound group (hereinafter, designated by (49, 11, A)), as a reference for storing to the memory, data up to (49, 36, 0A), that is, 49-th cluster, 36-th sector address and A sound group is reproduced and stored to the memory.

According to the above-described example, data of 2 clusters (corresponding to n clusters in FIG. 24A) is accumulated in the memory. (refer to SP2 and SP3 of FIG. 22, and FIGS. 24A and 24B)

Next, the user designates DEST that is the processing point at the post edit portion by using the JOG dial or the like and the start point and the finish point of the data stored to the memory is determined as follows with the designated processing point as a reference.

The setting of the start point and the finish point depends on the amount of data determined by the in point IN that is an editing start point at the designated pre edit portion and the out point OUT that is the editing finish point thereof.

Accordingly, the setting is determined such that data of 0 cluster, 31 sector addresses and 8 sound groups corresponding to a difference between the finish point at 49-th cluster address, 11-th sector address and A sound group and the start point at 48-th cluster address, 12-th sector address and 2 sound group, can be secured.

According to the above-described example, although it seems that data of a maximum of 1 cluster may be stored in the memory since it is the data amount that is less than 1 cluster, when actually, the DEST point is set in the vicinity of the end point of the cluster, a cluster disposed successively must be stored.

In this way, centering on DEST, a read start cluster at a post edit portion and a read finish cluster (corresponding to m cluster in FIG. 24A) thereof are generated such that data amount determined by the in point IN that is the editing start point at the pre edit portion and the out point OUT that is the editing finish point, can sufficiently be secured, the reproducing operation is performed with the read start cluster and the read finish cluster as references and the reproduced data is stored to the memory 20. (refer to SP4, SP5 of FIG. 22 and FIGS. 24A and 24B)

In the above-described processing, attention must be paid to the point where although the user designates the range as the data at the pre edit portion only with respect to a specific channel, data spread on the memory includes data of other channel accompanied to the specific channel designated by the user.

According to the recording device of the present invention, the unit of writing data is determined as the unit of cluster and accordingly, when data having a length shorter than the length of a cluster is intended to edit, a total of the cluster including the short data at the pre edit portion is stored once on the memory.

The operation of editing the short data after storing it to the memory, is carried out in the memory and after finishing the editing operation, the writing operation by the unit of cluster is again carried out.

The data of the channel at the copied portion designated by the user is read from the memory among the data at the pre edit portion stored to the memory 20, and is copied to data of a channel at the copying portion. (refer to SP6 of FIG. 22 and FIG. 24C)

After the copying processing, m cluster is read from the memory and overwritten to a position on the disk where it is originally located. (SP7 of FIG. 22)

Figure 24A:
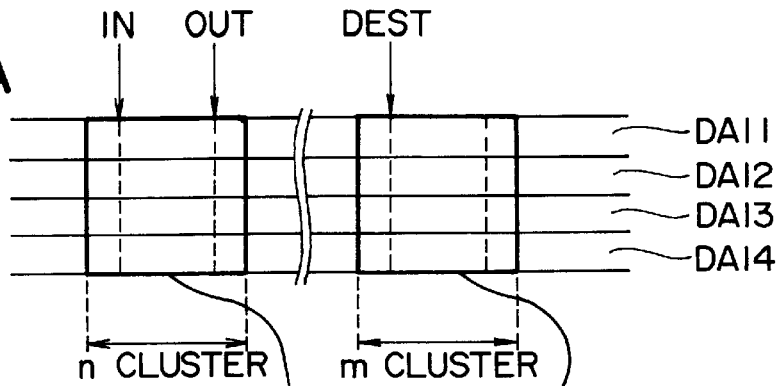
FIG. 24A is a schematic view for designating a pre edit portion and a post edit portion in the 4 channel data arranged time-sequentially and continuously.
Figure 24B:
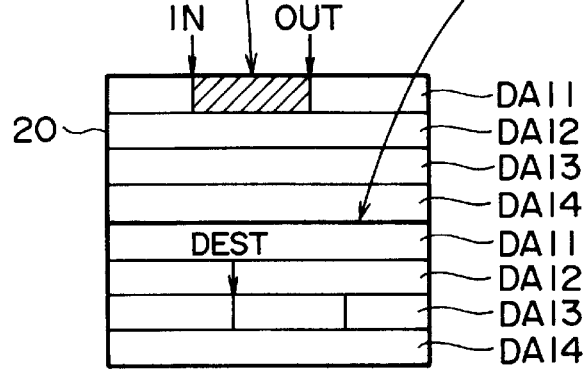
FIG. 24B is a schematic view of an inner portion of a memory when data of the pre edit portion and data of the post edit portion are stored in the memory.
Figure 24C:
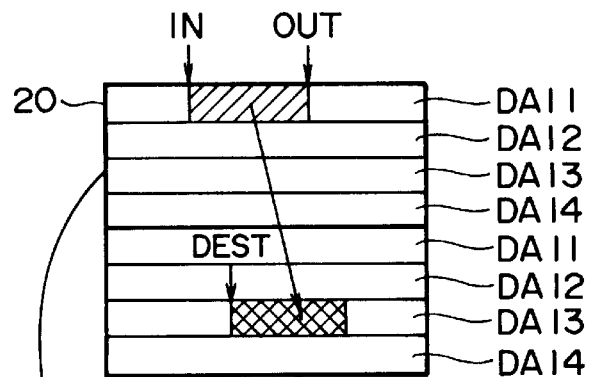
FIG. 24C is a schematic view for copying 1 channel data at the pre edit portion shown by the schematic view of the inner portion of the memory to 3 channel data at the post edit portion.
Figure 24D:
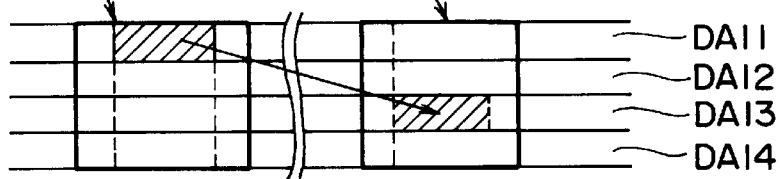
FIG. 24D is a schematic view for explaining the copying operation of 1 channel data at the pre edit portion to 3 channel data at the post edit portion in 4 channel data arranged time-sequentially and continuously.

It is understood that by performing the above-described processing, as a result, only the data of channel 3 is rewritten to the data of channel 1 at the pre edit portion and nothing is changed with respect to other channel data as shown by FIG. 24D.

Although in the above-described copying processing, only the reading operation is performed and the writing operation is not performed with respect to the data at the pre edit portion, when the moving processing is performed, the moving processing can be realized by erasing the data at the pre edit portion.

According to step SP8 of FIG. 22, whether a user designates the copying processing or the moving processing is determined and if it is a copying processing, whether all the editing operation is finished is determined at step SP9. When the user designates the moving processing in step SP8 of FIG. 22, the data at a location corresponding to the in point IN that is the editing start point and the out point OUT that is the editing finish point on the memory 20 (hatched portion in FIG. 24C) is all replaced by Null data by which the portion is made soundless.

Incidentally, when the amount of data determined by the in point IN that is the editing start point of the designated pre edit portion and the out point OUT that is the editing finish point thereof, far exceeds the capacity of the memory 22, in the case of the copying processing, the above-described steps of SP2, SP3, SP4, SP5, SP6, SP7, SP8 and SP9 in FIG. 22 are carried out until the copying processing is finished successively with respect to all the clusters.

Incidentally, although an explanation has been given of the editing processing with respect to data of 4 channels, a similar editing processing can be carried out also with respect to audio signals of 2 channels and 1 channel by accumulating data at a pre edit portion and a post edit portion to the memory, performing actual editing operation in the memory by the unit of sound group and rerecording the data by the unit of cluster after the editing processing.

An explanation will be given of a procedure for carrying out the exchanging processing among channels in reference to the flowchart of FIG. 26 and schematic views of FIGS. 27A through 27D as follows.

A user designates an in point IN that is an editing start point of a channel and an out point OUT that is an editing finish point as a first channel data by using a JOG dial or the like and sets a start point and a finish point of data stored to a memory with a designated editing point as a reference.

A start point and a finish point to be read on a record medium are determined on the basis of the in point IN that is the designated editing start point and the out point OUT that is the designated editing finish point, data is reproduced and the reproduced data is stored to a memory 22.

In this case, not only the first channel data but a second through a fourth channel data which are multiplexed are stored along therewith. (SP22, SP23 of FIG. 26 and FIG. 27B)

Next, the user designates DEST that is a processing point as a third channel data by using a JOG dial or the like and sets the start point and the finish point of the data stored to the memory with the designated processing point as a reference as follows.

According to the setting of the start point and the finish point, an area equivalent to the amount of data determined by the in point IN that is the editing start point of the designated first channel data and the out point OUT that is the editing finish point thereof, is secured. Incidentally, the data area secured on the memory depends on the location of DEST that is the processing point as described above.

The start point and the finish point to be read on the record medium on the basis of DEST that is the processing point, are determined and the data is reproduced and the reproduced data is stored to the memory 22.

In this case, not only the first channel data but a second through a fourth channel data which are multiplexed, are stored to the memory 22 along therewith. (steps SP24 and SP25 of FIG. 26 and FIG. 27B)

The desired data of a channel designated by the user is read from the memory among the first channel data stored to the memory 20 and escaped to a first register, not shown, and the third channel data is also escaped from the memory to a second register, not shown.

Figure 26:
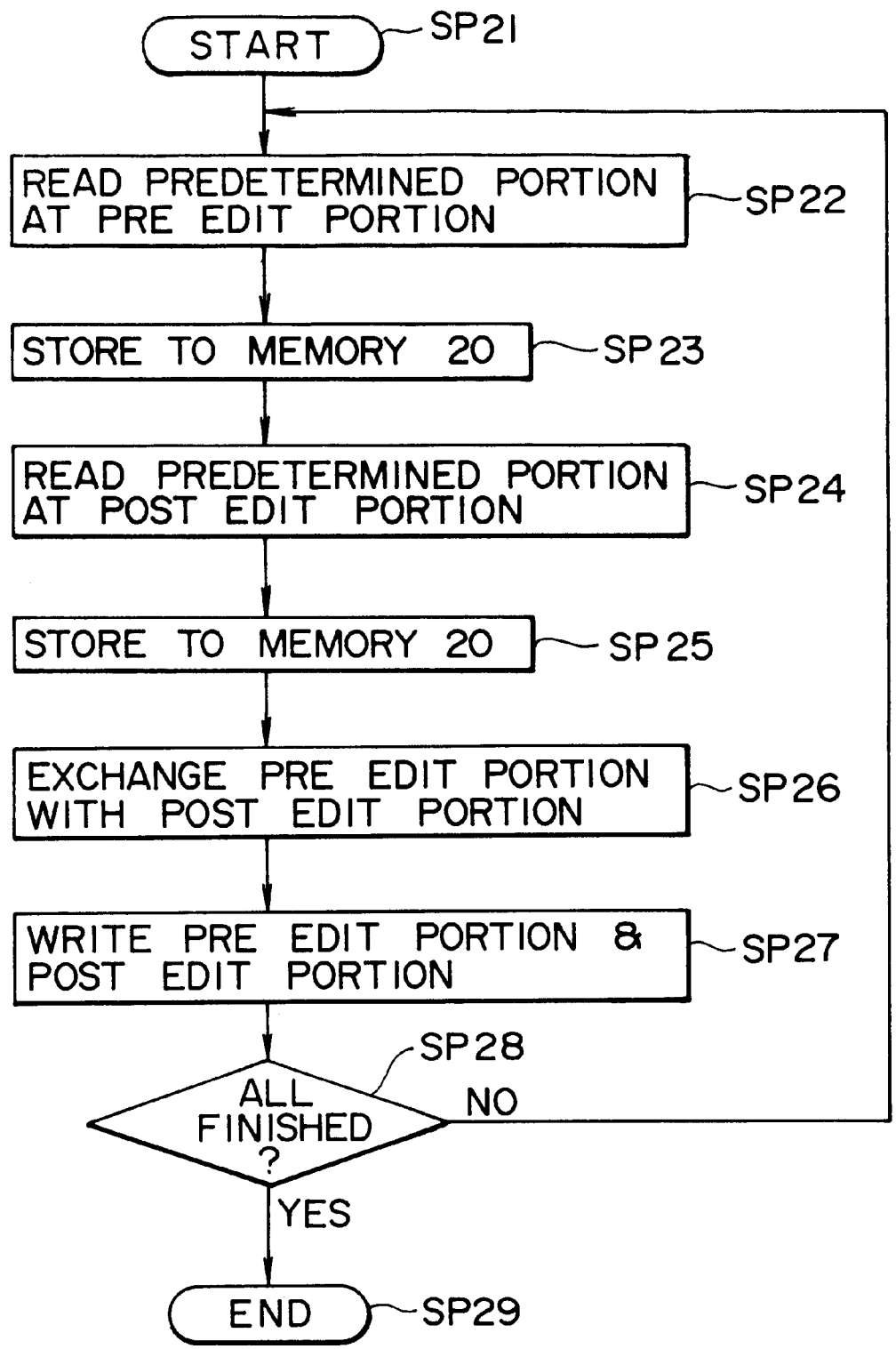
FIG. 26 is a flowchart showing an exchanging processing for exchanging a portion of one channel data of multi channel data according to the present invention with a portion of other channel data.
Figure 27A:
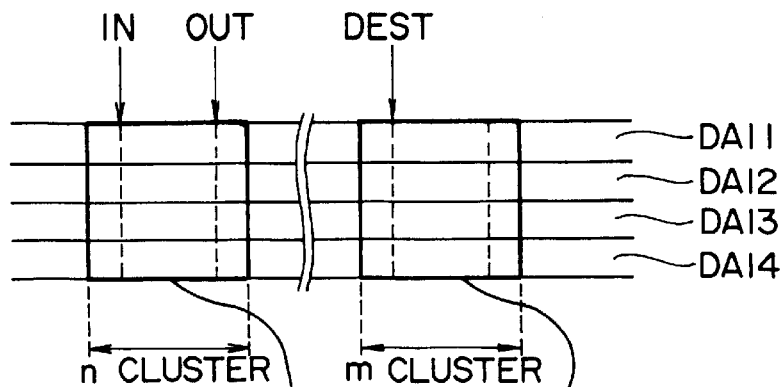
FIG. 27A is a schematic view for designating a first channel data and a second channel data in 4 channel data arranged time-sequentially and continuously.
Figure 27B:
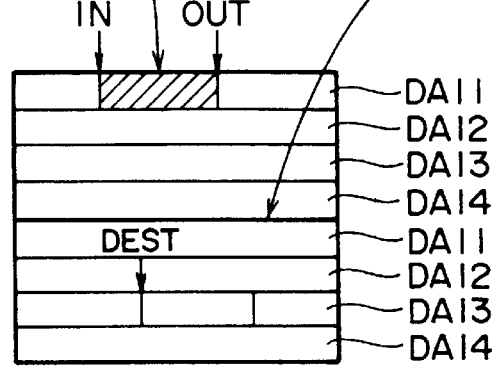
FIG. 27B is a schematic view of an inner portion of memory when the first channel data and the second channel data are stored in a memory.
Figure 27C:
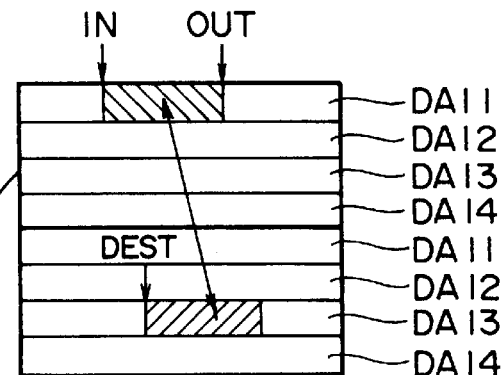
FIG. 27C is a schematic view showing an exchanging processing in which the first channel data shown by the schematic view of the inner portion of the memory is exchanged with the second channel data.

The exchanging processing is performed on the memory by using the escaped data as shown by FIG. 27C. (refer to SP26 of FIG. 26 and FIG. 27C)

After performing the exchanging processing, data corresponding to the first channel data is read from the memory by the unit of cluster and is rerecorded at the original location and data corresponding to the third channel data is read from the memory by the unit of cluster and is rerecorded at the original location. (refer to SP27 of FIG. 26 and FIG. 27D)

Figure 27D:
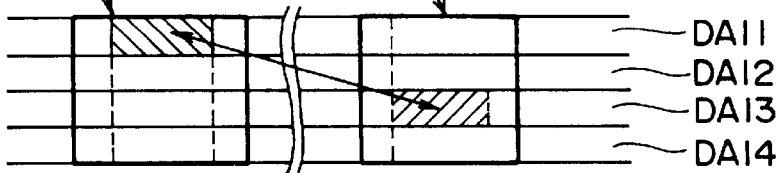
FIG. 27D is a schematic view for explaining movement where the first channel data and the second channel data are exchanged with each other in 4 channel data arranged time-sequentially and continuously.

Incidentally, although it seems that the recording operation is performed with respect to only the hatched parts in FIG. 27D, actually, all the channel data included in the same block are overwritten. (All of portions surrounded by bold lines in FIG. 27D)

Incidentally, when the amount of data determined by the in point IN that is the editing start point of the set first channel data and the out point OUT that is the editing finish point, according to the exchanging processing, steps of SP22, SP23, SP24, SP25, SP26, SP27 and SP28 of FIG. 26 are carried out until the exchanging processing is finished successively with respect to all the clusters.

Incidentally, although an explanation has been given of the editing processing with respect to data of 4 channels, the exchanging processing can naturally be realized similarly by the unit of cluster also with respect to audio signals of 2 channels and 1 channel.

An explanation will be given of the procedure of carrying out the erasing processing of a predetermined channel in reference to a flowchart of FIG. 28 and schematic views of FIGS. 29A through 29D as follows.

A user designates an in point IN that is an editing start point of a channel intended to perform the erasing processing and an out point OUT that is an editing finish point thereof by using a JOG dial or the like and sets a reproducing start point and a reproducing finish point of data to be stored to a memory with a designated editing point as a reference.

A reproducing start point and a reproducing finish point to be read on a record medium is determined on the basis of the in point IN that is the set editing start point and the out point OUT that is the set editing finish point, data is reproduced and the reproduced data is stored to the memory 22. (steps SP32, SP33 of FIG. 28 and FIG. 29A)

In this case, not only the first channel data that is designated to erase but a second through a fourth channel data corresponding to the first channel data which are multiplexed, are stored along therewith.

Null data is written to the desired data of a channel designated by the user among the first channel data stored to the memory 20. (FIG. 29C and step SP34 of FIG. 28)

After the recording processing of Null data, data corresponding to the first channel data is read from the memory by the unit of cluster and is rerecorded at the original location. (refer to SP35 of FIG. 28 and FIG. 29D)

Figure 29A:
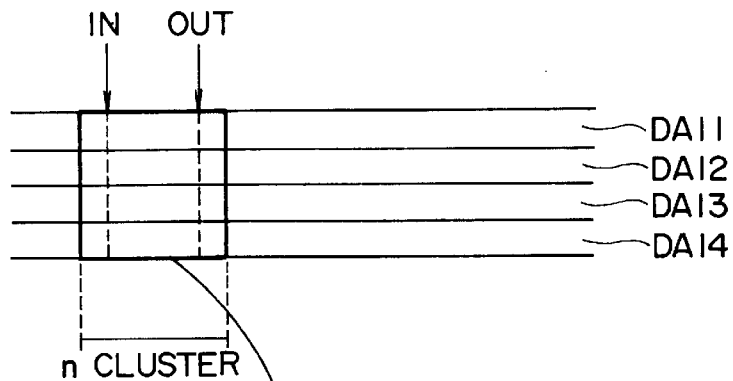
FIG. 29A is a schematic view for designating the channel data intended to erase in 4 channel data arranged time-sequentially and continuously.
Figure 29B:
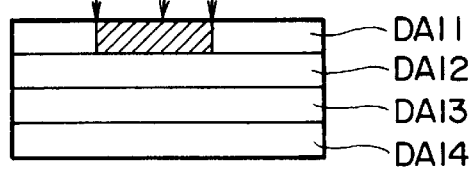
FIG. 29B is a schematic view of an inner portion of a memory when the erased and designated channel data is stored in a memory.
Figure 29C:
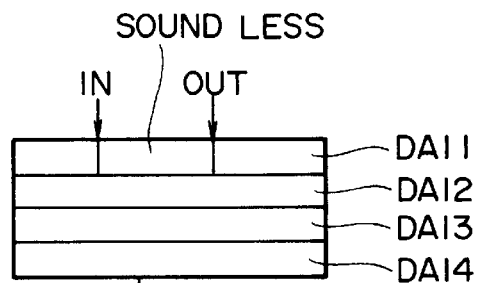
FIG. 29C is a schematic view showing an erasing processing in which soundless data is recorded at a portion of channel data intended to erase in the memory.
Figure 29D:
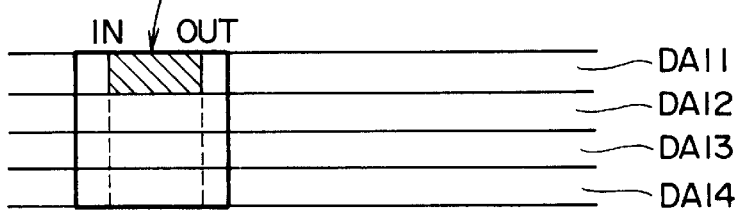
FIG. 29D is a schematic view of writing an erased portion by the unit of cluster on the memory in 4 channel data arranged time-sequentially and continuously.

Incidentally, although it seems that the recording operation is carried out with respect to only the hatched part in FIG. 29D, actually, all the channel data included in the same block are overwritten. (all the portion surrounded by the bold line of FIG. 27D)

Figure 28:
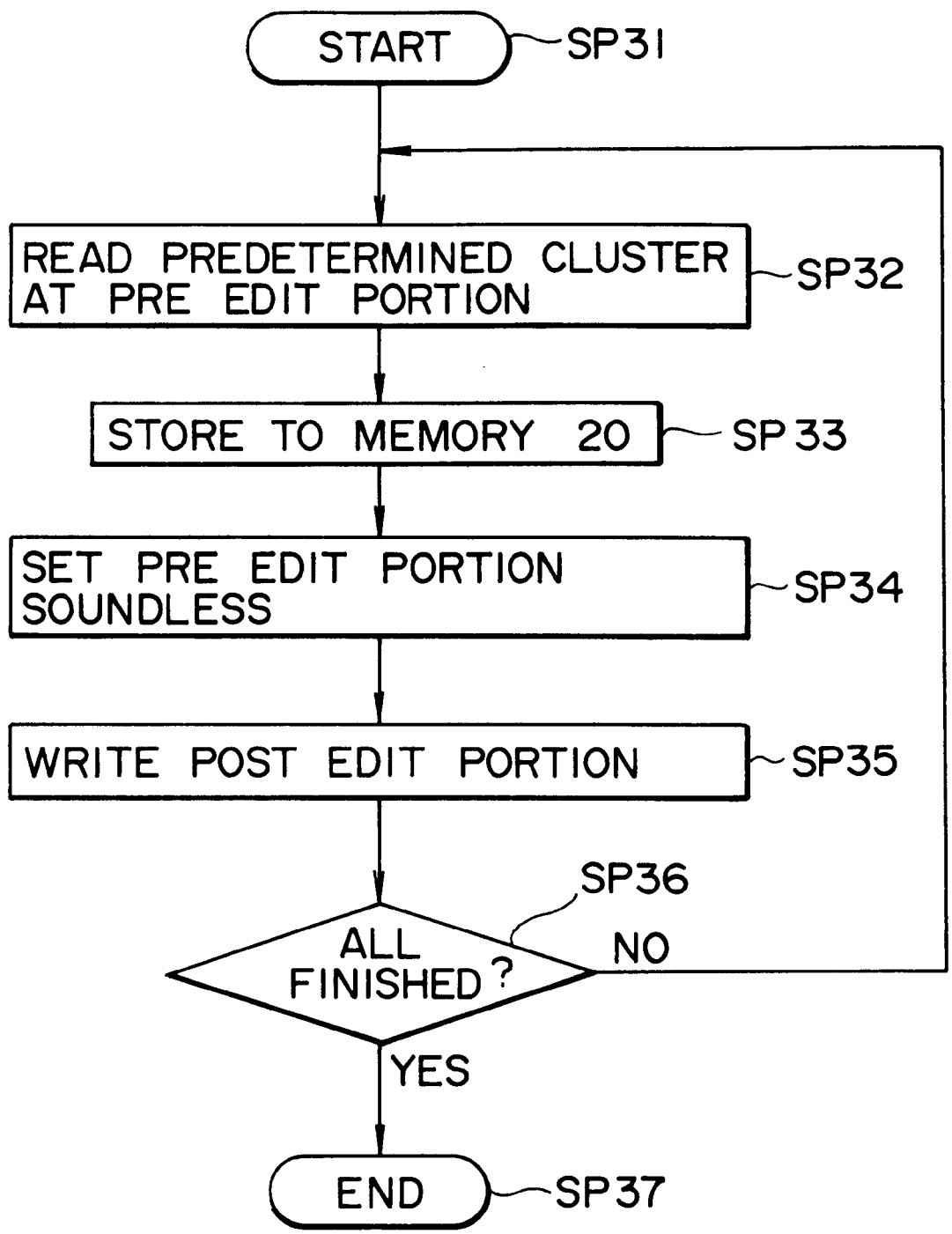
FIG. 28 is a flowchart showing an erasing processing for erasing one portion of one channel data in multi channel data according to the present invention.

Incidentally, when the amount of data determined by the in point IN that is the editing start point of the first channel data in the set range of erasure and the out point OUT thereof, far exceeds the capacity of the memory 22, according to the exchanging processing, steps of SP32, SP33, SP34, SP35 and SP36 in FIG. 28 are carried out until the exchanging processing is finished successively with respect to all the clusters.

(1-3) Undo processing

According to the system control circuit 15, when the operator 7A of Undo shown by FIG. 7 is operated to push after executing the various editing processings, the processings of Undo and Redo are repeated in correspondence with the pushing operation.

According to the editing processings shown by FIGS. 12A and 12B through 21A and 21B, among the above-described editing processings, the overwriting operation is not carried out and accordingly, when UTOC before edition that is held in the UTOC memory 24 is temporarily escaped to the escaping region provided in the UTOC memory 24 and the operator 7A of Undo is operated to push, the system control circuit 15 reproduces the state immediately before the operation and carries out the processings of Undo and Redo by exchanging the escaped UTOC before edition with UTOC after edition.

In the exchanging processing among multi channels, the processings of Undo and Redo are carried out by repeating the processing of exchange between the pre edit portion and the post edit portion.

By contrast, in the copying, moving and erasing processing in the editing operation among multi channels, the audio signals recorded to the magneto-optic disk are lost by carrying out the overwriting operation and therefore, the system control circuit 15 previously escapes the audio signal before edition on the disk by the unit of cluster and reproduces the state immediately before the operation by the escaped clusters thereby carrying out the processings of Undo and Redo.

Figure 30:
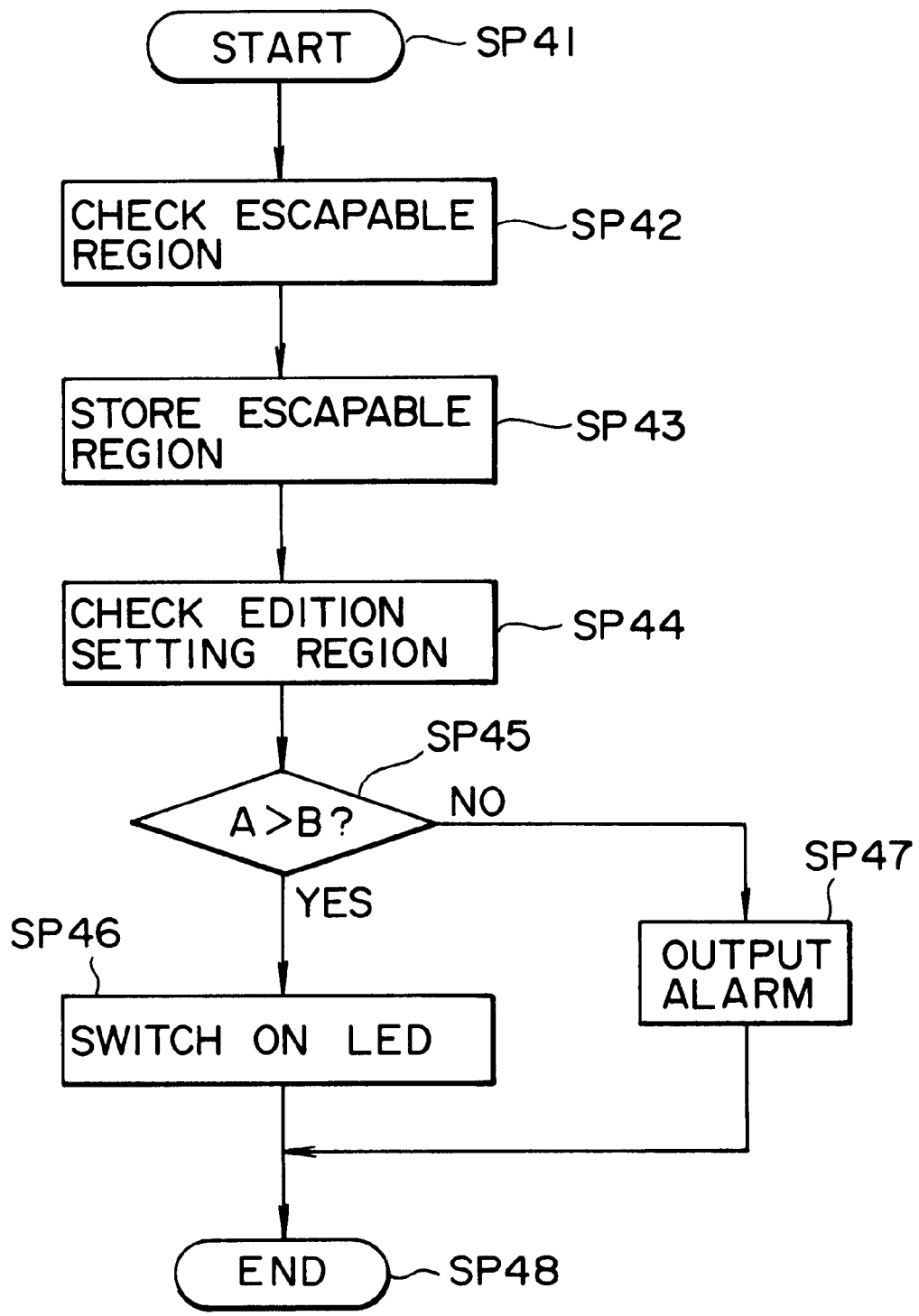
FIG. 30 is a flowchart for escaping data for restoring at an occasion of UNDO in performing an UNDO/REDO processing.

When a user selects the copying, moving or erasing processing in the editing operation among channels, the system control circuit 15 carries out a processing procedure shown by FIG. 30 at a predetermined period of time and informs the user of whether the Undo processing can be carried out previously.

Figures 31A, 31B, 31C:
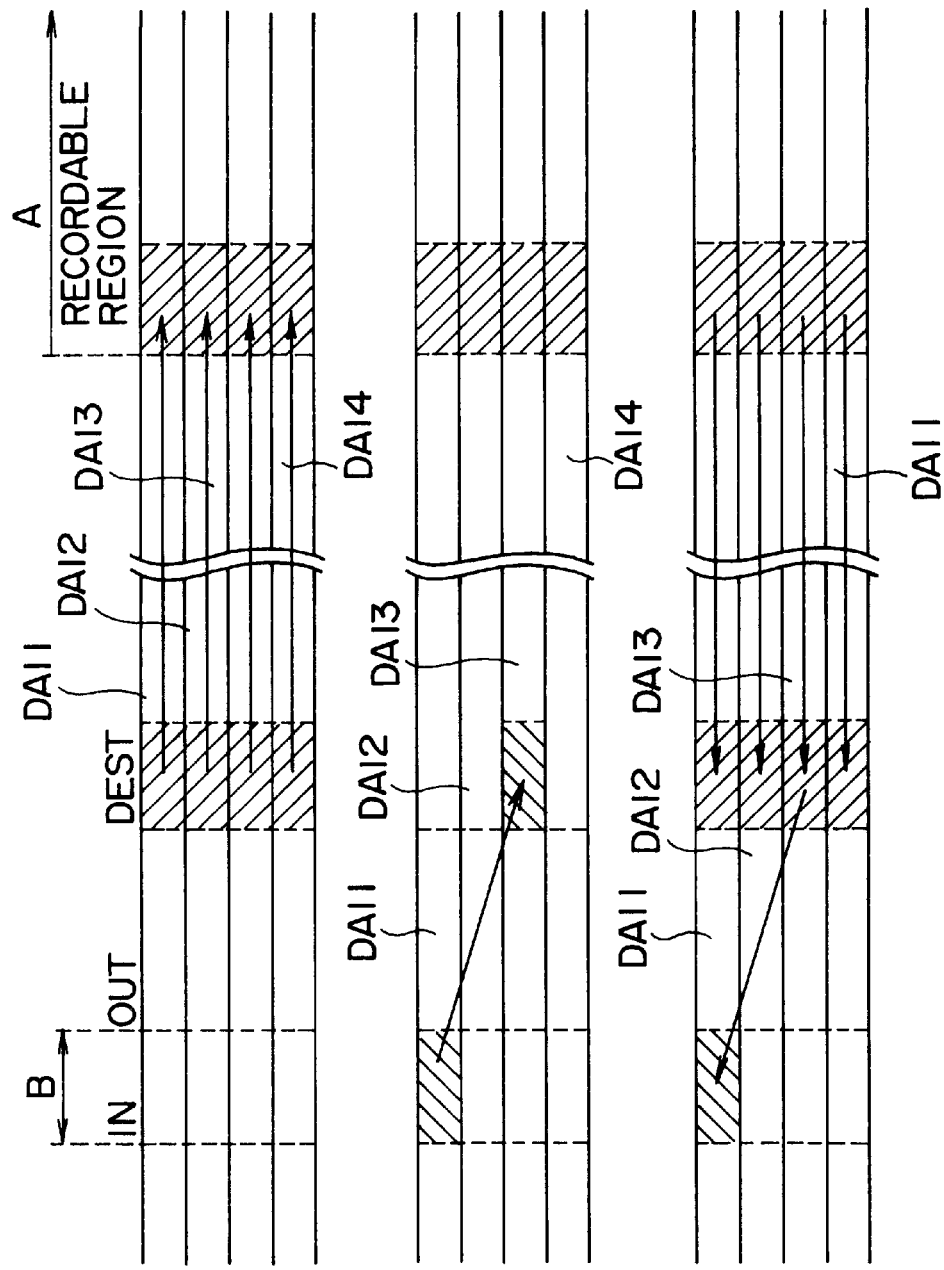
FIG. 31A is a schematic view of escaping data at a post edit portion to an escaping region.
FIG. 31B is a schematic view of performing an editing processing from a pre edit portion to the post edit portion after the escaping processing.
FIG. 31C is a schematic view of returning data which has been present at the pre edit portion before the editing operation and which has been moved to the post edit portion and returning data escaped at the escaping region to the original post edit portion when an UNDO operation is designated.

According to the system control circuit 15, the operation proceeds from step SP41 to step SP42 and checks whether a capacity A of an escapable region is present on the disk. As shown by FIG. 31A, the system control circuit 15 makes an access to the TOC memory 24, searches successively slots in accordance with the pointer (P-FRA) designating the recordable region and searches the recordable region by which slots in conformity with the amount of data to be escaped are selected.

With regard to the escapable region, the slots indicating the recordable region designated by P-FRA are searched and the recordable capacity of the respective slots is spread on the UTOC memory. (SP43 of FIG. 30)

Further, according to the system control circuit 15, the operation proceeds to step SP44 and detects a capacity B of an edition setting region by detecting the number of sound groups of data lost by edition from an in point IN and an out point OUT set by a user.

Successively, according to the system control circuit 15, the operation proceeds to step SP45 and whether the capacity A of the escapable region is larger than the data amount B is determined corresponding to sound groups of data lost by edition and when an affirmative result is obtained, the operation proceeds to step SP46 since the data lost by edition can be escaped to the escapable region by the unit of sound group and switches on the light emitting diodes arranged at the operator 7A of Undo. Thereby, the system control circuit 15 illuminates the window 7B of the operator 7A in green and informs the user that the Undo processing can be carried out.

By contrast, when a negative result is obtained at step SP45, according to the system control circuit 15, the operation proceeds to step SP47 and turns off the light emitting diodes arranged at the operator 7A of Undo. Thereby, the system control circuit 15 stops illuminating the window 7B and informs the user that the Undo processing cannot be carried out.

When the user is informed in this way, according to the system control circuit 15, the operation proceeds from step SP46 or step SP47 to step SP48 by which the processing procedure is finished. In this way, the user can carry out the editing processing after confirming whether the Undo processing can be carried out or not and the editing processing can be executed in the magneto-optic disk device 1 pertinently by that amount.

Further, according to the editing operation by the unit of musical composition or with respect to a portion in the musical composition (by the unit of sound group) formed by the UTOC edition, there is no audio signal lost by the editing operation as in the editing operation among channels and accordingly, the system control circuit 15 always illuminates the window 7B of the operator 7A in green and informs the user that the Undo processing can be carried out. Thereby, according to the magneto-optic disk device 1, even when the user selects any of the editing processings, the processings of Undo and Redo can be carried out with similar operational feeling.

Figure 32:
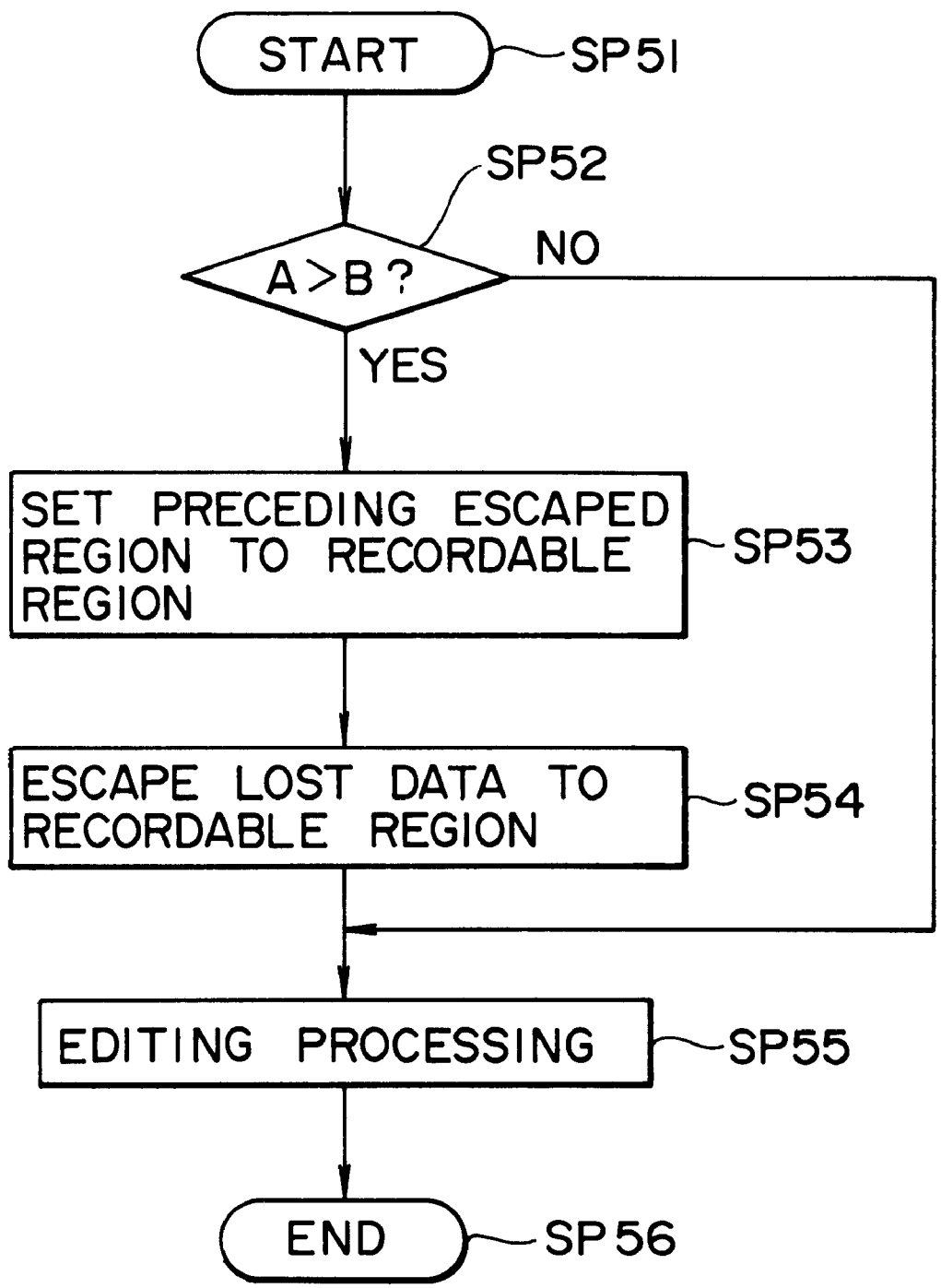
FIG. 32 is a flowchart showing a processing content when an UNDO processing is designated.

That is, according to the system control circuit 15, when a user operates the operator of execution after setting the conditions of editing operation, a processing procedure shown by FIG. 32 is executed. Here, according to the system control circuit 15, the operation proceeds from step SP51 to step SP52 and whether the capacity A of the escapable region is larger than the capacity B is determined and when an affirmative result is obtained, the operation proceeds to step SP53.

Here, the system control circuit 15 makes an access to the TOC memory 24 and rewrites the content of UTOC by which when a part of audio signals escaped at a preceding time is present, the part is set to the recordable region. Thereby, the system control circuit 15 executes processing corresponding to the case where the capacity of the escaped audio signals is added to the capacity of the recordable region by which the capacity A of the escapable region is set. The presence or absence of the escaped audio signals is searched by P-TNO and whether the backup flag is set to the track mode is determined.

Successively, according to the system control circuit 15, the operation proceeds to step SP54 and as shown by FIG. 31A, data lost by the editing operation is recorded to the recordable region by the unit of sound group. Here, the system control circuit 15 drives the disk unit 22 and holds the audio signal corresponding to the data amount between the in point IN and the out point OUT to the memory 20 by reproducing the signal from the processing point DEST and records the demodulation data held by the memory 20 to the recordable region. Further, when the amount of data to be escaped is larger than the capacity of the memory 20, the processings of reproduction and recording are repeated by which data lost by the editing operation is escaped. Incidentally, in the erasing processing, the data between the in point IN and the out point OUT to be erased is escaped in place of the data at the processing point DEST and thereafter.

Further, the system control circuit 15 makes an access to the TOC memory 24 and sets parts escaping the audio signals to a start address and an end address corresponding to slots designated by predetermined P-TNO. In this case, the system control circuit 15 sets a backup flag of the mode data (track mode) by which it is registered that the slot is a slot escaping the audio signals. By performing the above-described processing, when a user simply operates the operator of reproduction, the system control circuit 15 controls the total operation such that with respect to the part where the backup flag is set, the reproduction is not carried out and further, the name of musical composition, the number of musical composition or the like is not displayed at the display panel 9 whereby the escaped audio signal cannot be recognized by the user by which the user is not confused by the escaped audio signal.

Figure 25A:
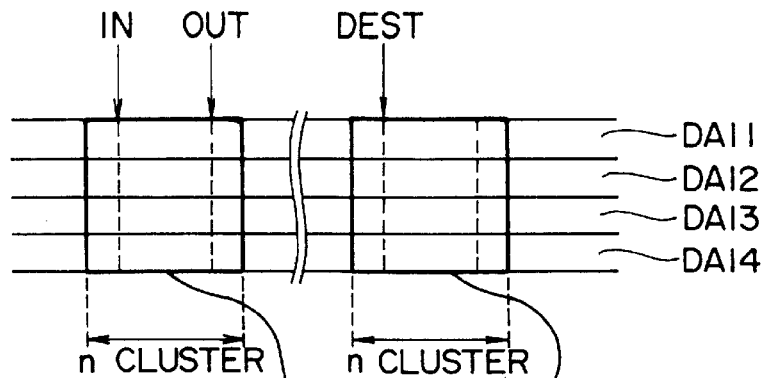
FIG. 25A is a schematic view for designating a pre edit portion and a post edit portion in 4 channel data arranged time-sequentially and continuously.
Figure 25B:
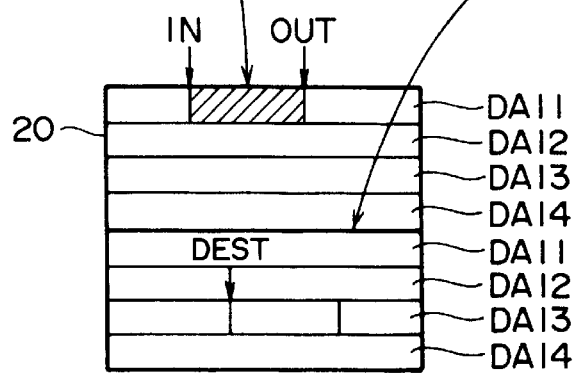
FIG. 25B is a schematic view of an inner portion of a memory when data at the pre edit portion and data at the post edit portion are stored in the memory.
Figure 25C:
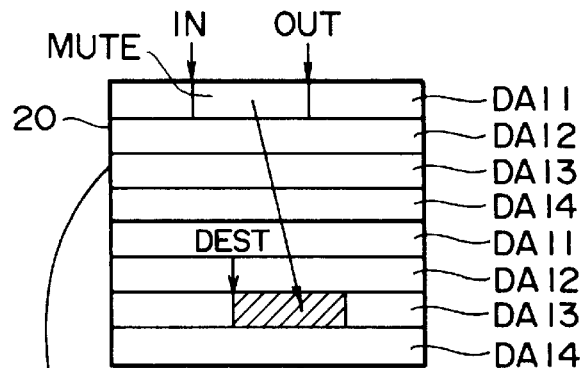
FIG. 25C is a schematic view showing a so-called moving processing where 1 channel data at the pre edit portion shown by the schematic view of the inner portion of the memory is copied to 3 channel data at the post edit portion and the 1 channel data at the pre edit portion is erased after the copying operation.
Figure 25D:
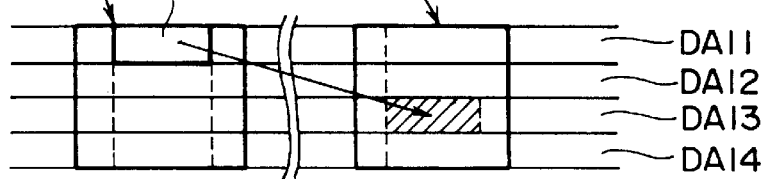
FIG. 25D is a schematic view for explaining movement of 1 channel data at the pre edit portion to 3 channel data at the post edit portion in 4 channel data arranged time-sequentially and continuously.

When all the data lost in this way is escaped, according to the system control circuit 15, the operation proceeds to step SP55 and carries out the editing operation set by the user and proceeds to step SP56 by which the processing procedure is finished. Thereby, according to the system control circuit 15, when the operator 7A of Undo is operated by the user after finishing the processing, the pre edit portion and the post edit portion are recovered to the state immediately before the operation by using the escaped audio signals (FIG. 25(C)).

By contrast, when a negative result is obtained at step SP52, the user recognizes that the Undo processing cannot carried out and operates the operator of execution by which the operation proceeds from step SP52 directly to step SP55 and proceeds to step SP56 after executing the editing processing without escaping the audio signals.

Further, in the updating processing of UTOC in discharging the disk cassette 3 and in the case of the request of writing, the system control circuit 15 can search the part where the backup flag is set by the pointer (P-FRA) showing the recordable region and updates UTOC of the magneto-optic disk after updating the TOC memory 24 such that searching by the pointers (P-TNO1, , P-TNO255) designating the musical compositions is difficult.

(2) Operation of embodiments

According to the above-described constitution, when the disk cassette 3 is loaded to the magneto-optic disk device 1, the control region of the magneto-optic disk is reproduced by the disk unit 22 and PTOC and UTOC of the control region is stored to the TOC memory 24.

Thereafter, when the magneto-optic disk device 1 is set to the record mode, the audio signals SA1 through SA4 inputted from an outside device, are converted into digital audio signals at the analog to digital conversion circuit 12 and thereafter inputted to the data compression circuit 13 where signals are blocked by the unit of 11.61 msec by being subjected to time division and the respective blocks are compressed in respect of a time axis by data compression.

The data-compressed digital audio signals are subjected to time division multiplexing successively and circulatingly by the unit of block at the successive time correction circuit 14 by which 1 channel of the digital audio signal DA1 is formed. In this case, in recording 4 channels of audio signals SA1 through SA4, 4 channels of digital audio signals the time axis of which is compressed, are switched successively and circulatingly by the unit of block thereby forming the digital audio signal DA1. Further, in recording 2 channels of audio signals SA1 and SA2, 2 channels of the digital audio signals the time axis of which is compressed, are switched successively and alternately by the unit of block thereby forming the digital audio signal DA1. Further, in recording 1 channel of audio signals, the digital audio signal DA1 is formed from 1 channel of audio signals that is simply subjected to time division and data compression.

The digital audio signal DA1 formed as described above, is inputted to the memory 20 via the bus BUS, where the signal is arranged such that 4 blocks of the digital audio signal DA1 forms 2 sound groups and the data structure of sectors are formed by adding addresses, headers or the like. In this case, the digital audio signal DA1 is arranged to constitute 2 sectors by 11 sound groups and when sectors for 1 cluster are formed, the digital audio signal DA1 is outputted to the signal processing circuit 23 as record data along with data of link sectors, sub sector, header or the like at timings in synchronism with the rotation of the magneto-optic disk.

Here, the record data is added with the error correction code converted into modulation data by being subjected to encoding processing and a modulation magnetic field is formed by the modulation data and the audio signals SA1 through SA4 are recorded to the magneto-optic disk by thermomagnetic recording.

According to the audio signals recorded to the magneto-optic disk in this way, the name of musical composition, the number of musical composition and the like are displayed on the display panel 9 in accordance with the operation of a user by updating UTOC stored to the TOC memory 24.

At this occasion, according to the magneto-optic disk device, with respect to slots corresponding to the pointers (P-TNO1, . . . , P-TNO255), the mode data (TRACK MODE) is detected by the system control circuit 15 and with respect to the audio signals where the backup flag is set to the mode data (TRACK MODE), the display of name of musical composition, number of musical composition and the like is stopped. Thereby, the escaped audio signals where the backup flag is set, among the audio signals recorded to the magneto-optic disk, are held such that they cannot be recognized by a user by which confusion of the user can effectively be avoided.

When the user selects musical composition and selects the reproduction mode under this state, the reproduced data is formed by the reproduction signal obtained from the magneto-optic disk and the reproduced data is decoded at the signal processing circuit 23. The decoded data obtained by the decoding operation is temporarily stored in the memory 20, extra data such as header or the like is removed and the decoded data is inputted to the time correction circuit 14 by the digital audio signal DA1.

Here, the digital audio signal DA1 is converted into the digital audio signals of the original channel number in accordance with the mode data (TRACK MODE) that is reverse to the recording operation and thereafter, subjected to data decompression at the successive data decompression circuit 18. Further, the digital audio signals which have been subjected to data decompression, are converted into analog signals at the digital to analog conversion circuit 19 and are outputted.

Also in the reproduction of the audio signals recorded on the magneto-optic disk, the audio signals where the backup flag is set, are not reproduced and left, by which the escaped audio signals where the backup flag is set, cannot be seen or heard by the user thereby avoiding effectively confusion of the user.

When the user selects the mode of the editing operation by designating musical compositions, the editing processing by the unit of musical composition is carried out and processings of copying, moving, exchanging, erasing, combining and dividing are carried out by the so-called UTOC edition where UTOC stored to the TOC memory 24 is updated.

Further, when the user selects the mode of the editing operation by setting the in point IN, the out point OUT and the like by the unit of sound group, the editing processing (editing processing by the unit of sound group) of a portion of musical composition is carried out by the similar UTOC editing operation and the processing of inserting, moving, exchanging or erasing selected by the user is executed.

According to the editing processing by the unit of musical composition and the unit of sound group, when in the TOC memory 24, UTOC at start of edition is stored to the escaping region, the editing processing is carried out and thereafter, the operator 7A of Undo is operated by the user without executing successive editing processing, UTOC immediately before starting the processing is reproduced by UTOC stored to the escaping region. In this way, the state immediately before starting the edition is reproduced by the reproduced UTOC and the processing of Undo is carried out.

Further, in reproducing UTOC immediately before starting the processing, UTOC until that time is stored to the escaping region and when a user again operates the operator 7A, UTOC after the editing processing is reproduced by UTOC stored to the escaping region. In this way, the state after the editing processing is reproduced by the reproduced UTOC and the processing of Redo is carried out.

Meanwhile, when the user selects the mode of the editing operation by setting the in point IN, the out point OUT and the like by the unit of sound group in one musical composition or among musical compositions, the editing processing among channels is executed.

According to the editing processing among channels, when copying processing is designated, the audio signals at the post edit portion comprising the copied portion at and after the processing point DEST, are reproduced by a predetermined amount by the magneto-optic disk in the unit of cluster and are stored to the memory 20 and the audio signals at the pre edit portion comprising the audio signals between the in point IN and the out point OUT, are reproduced by a corresponding data amount by the magneto-optic disk and are stored to the memory 20.

In this case, these audio signals are held by the memory 20 in the sector structure recorded on the magneto-optic disk, the audio signals of a channel designated by the user are selected by the unit of sound group from the pre edit portion and sectors at the post edit portion are updated by the audio signals. Thereby, in the memory 20, the audio signals at the pre edit portion are copied to the post edit portion by the unit of sound group among channels and the copied post edit portion is recorded at the original recording position of the magneto-optic disk. At the pre edit portion and the post edit portion, the reproducing and recording processings are repeated by the necessary number of times and the audio signals between the in point IN and the out point OUT are copied to the post edit portion.

In the case of the moving operation, in addition to the updating processing at the post edit portion by the copying operation, soundless decoded data is recorded to the channel at the pre edit portion on the memory 20. Further, in recording the post edit portion on the magneto-optic disk, the pre edit portion is also recorded on the original recording position of the magneto-optic disk along therewith. In this way, according to the magneto-optic disk, in the memory 20, the audio signals at the pre edit portion are transferred to the post edit portion by the unit of sound group among channels, the pre edit portion and the post edit portion are recorded at the original recording positions of the magneto-optic disk and the reproducing and recording processings are repeated by the necessary number of times thereby transferring the audio signals between the in point IN and the out point OUT to the post edit portion.

In the case of the exchanging operation, in place of recording the soundless signal in the moving processing, the audio signals at the post edit portion are recorded to the pre edit portion on the memory 20. Thereby, according to the magneto-optic disk, in the memory 20, the audio signals at the pre edit portion and the post edit portion are exchanged by the unit of sound group among channels and thereafter, the pre edit portion and the post edit portion are recorded to the original recording positions of the magneto-optic disk and the reproducing and recording processings are repeated by the necessary number of times thereby exchanging the audio signals between the in point IN and the out point OUT by the audio signals at the post edit portion.

In the case of the erasing operation, only the audio signals at the pre edit portion are reproduced from the magneto-optic disk and stored in the memory 20 and the soundless signal is recorded to the channel selected by the user on the memory 20. Further, the pre edit portion is recorded to the original region of the magneto-optic disk and the reproducing and recording processings are repeated by the necessary number of times. Thereby, a desired channel between the in point IN and the out point OUT is erased by the unit of sound group.

By such an editing processing among channels, the magneto-optic disk device 1 can carry out, for example, an editing operation where musical plays are recorded individually to 4 channels and parts of the respective musical plays are repeated and recorded as necessary, an editing operation where other parts are exchanged and the like by which the editing operation which are intended by the user, can be carried out simply by that amount.

According to the editing processing among channels, when a user selects processings of copying, moving and erasing by setting the in point IN and the out point OUT, the data amount B of the audio signals lost by the editing processing and the capacity A of the region where the audio signals can be escaped, are detected at a constant period of time by the system control circuit 15. By a result of comparison between the detected data amount B and the capacity A, whether the audio signals lost by the editing processing are escapable, is determined and when they are escapable, the operator 7A of Undo is illuminated in green and when they are difficult to escape, the illumination is turned off.

Thereby, the magneto-optic disk device 1 informs previously whether the processing of Undo can be performed to a user and awaits for the determination by the user. That is, for a user who needs Undo, when the Undo operation is difficult to execute, unnecessary musical compositions are erased and the recordable region is enhanced and thereafter, the editing operation is continued again by which the editing processing can be continued pertinently. Further, for a user who does not need the Undo operation, even when the Undo operation is difficult to execute, the editing operation can be continued and the editing processing can be continued pertinently.

According to the magneto-optic disk, when a user operates the operator of executing the editing operation in correspondence with the selection of the user, whether the audio signals lost by the editing processing are escapable is determined and when they are escapable, the audio signals lost by the editing processing are previously recorded to the escaping region and thereafter, the editing processing is executed. Also, when they are difficult to escape, the editing processing is directly executed.

In escaping the audio signals, according to the magneto-optic disk device 1, parts of the escaped audio signals are registered to UTOC by setting the backup flag by which the escaped audio signals are distinguished from other audio signals thereby effectively avoiding confusion of the user in displaying name of musical composition, number of musical composition and the like in the reproducing operation.

Further, in escaping the audio signals, escaped audio signals at a previous time are erased by operating UTOC by which a reduction in the recordable region can effectively be avoided when the escaping processings are repeated.

Further, in discharging the disk cassette 3, parts of the escaped audio signals are registered to UTOC as the recordable region in the case where writing thereof is requested, by which even when the disk cassette 3 is reproduced and recorded by other magneto-optic disk device, the escaped audio signals are held such that the user cannot recognize them at all.

(3) Effect of embodiments

According to the above-described constitution, audio signals can simply be edited among a plurality of channels by reading audio signals at a pre edit portion from a magneto-optic disk by a unit of cluster and modifying them by a unit of sound group on a memory and recording them to a post edit portion.

(4) Other embodiments

Incidentally, although in the above-described embodiments, mention has been given of the case where the editing processing among channels is executed by processing decoded data, the present invention is not limited thereto but is widely applicable to the case where the processing is performed at a stage of decompressing data and processings of mixing or the like are executed.

Further, in such an editing operation among channels, a marker sound designating an in point or the like may be added on the memory 20. Incidentally, even if the marker sound is added in such a way, the original audio signals are recorded and remain on the magneto-optic disk device by which impairment of original portions caused by adding the marker sound can effectively be avoided.

Further, although in the above-described embodiments, mention has been given of the case where audio signals lost by the editing operation are escaped by the unit of sound group, the present invention is not limited thereto but the audio signals lost by the editing operation may be escaped by the unit of cluster or only the channel of the lost audio signals may be escaped. Incidentally, in these cases, the audio signals may be escaped by executing the copying processing among channels or clusters may be formed only by the escaped audio signals.

Further, although in the above-described embodiments, mention has been given of the case where with respect to the escaped audio signals, the backup flag is set to UTOC of sector 0 or the mode data, the present invention is not limited thereto but the escaped audio signals may be identified by setting similar flags or the like.

Further, although in the above-described embodiments, mention has been given of the case where the audio signals lost by the editing operation are escaped to the magneto-optic disk, the present invention is not limited thereto but the audio signals may be escaped to a magneto-optic disk, a hard disk device, a memory or the like for operational use. Thereby, the processing of setting the backup flag can be omitted.

Further, although in the above-described embodiments, mention has been given of the case where the audio signals of 4 channels, 2 channels and 1 channel are blocked and recorded on the magneto-optic disk, the present invention is not limited thereto but is applicable widely also in the case where the audio signals are recorded by various numbers of channels.

Further, although in the above-described embodiments, mention has been given of the case where the audio signals recorded on the magneto-optic disk are edited, the present invention is not limited thereto but is widely applicable to the case where audio signals recorded on various record media such as an optical disk, a hard disk device, a magnetic tape, a semiconductor memory and the like, are edited.

As has been described, according to the present invention, audio signals can simply be edited among a plurality of channels by reading audio signals at a pre edit portion from a record medium, modifying them on a predetermined storing means and rerecording them to a post edit portion.

What is claimed is:

1. An editing device in which on a record medium having a unit of writing data determined to be a predetermined length, a plurality of channel data having a unit channel data length shorter than the unit length of writing data are recorded by being subjected to time division multiplexing and an editing processing is performed with respect to predetermined channels of the plurality of channels, said editing device comprising:

operating means for designating an editing range of a first specific channel data that is a pre edit portion designated by a user and an editing position of a second specific channel data that is a post edit portion designated by the user;

reproducing means for reproducing the plurality of channel data in respect of the editing range from the record medium based on the editing range at the pre edit portion designated by the operating means and reproducing the plurality of channel data in respect of the post edit portion from the record medium based on the designated editing position at the post edit portion designated by the operating means;

first storing means for storing the plurality of channel data at the pre edit portion reproduced by the reproducing means at each of the unit of writing data;

second storing means for storing the plurality of channel data at the post edit portion reproduced by the reproducing means at each of the unit of writing data;

overwriting means for reading the first specific channel data constituting the pre edit portion designated by the user from the first storing means and overwriting the read first specific channel data from a position corresponding to the second specific channel data at the post edit portion stored by the second storing means; and recording means for recording again the plurality of channel data stored to the second storing means to a portion on the record medium situated before the editing processing after the first specific channel data has been overwritten to the second storing means.

2. The editing device according to claim 1, wherein the editing device records again the plurality of channel data stored to the first storing means to a portion on the record medium situated before the editing processing after the first specific channel data have been overwritten to the second storing means.

3. The editing device according to claim 1, wherein the editing device performs an erasing processing with respect to the first specific channel data constituting the pre edit portion designated by the user and stored to the first storing means after the first specific channel data has been overwritten to the second storing means and records again the plurality of channel data stored to the first storing means to a portion on the record medium situated before the editing processing after the erasing processing.

4. The editing device according to claim 1, further comprising:

third storing means for escaping the second specific channel data at the post edit portion in the second storing means before the first specific channel data is overwritten to the second storing means; and wherein the editing device overwrites the second specific channel data read from the third storing means on the first specific channel data constituting the pre edit portion designated by the user and stored to the first storing means after the first specific channel data has been overwritten to the second storing means.

5. An editing method in which on a record medium having a unit of writing data determined to be a predetermined length, a plurality of channel data having a unit channel data length shorter than the unit length of writing data are recorded by being subjected to time division multiplexing and an editing processing is performed with respect to predetermined channels of the plurality of channels, said editing method comprising:

a step of designating an editing range of a first channel data constituting a pre edit portion designated by a user and an editing position of a second specific channel data constituting a post edit portion designated by the user;

a step of reproducing the plurality of channel data in respect of the editing range from the record medium based on the designated editing range of the pre edit portion and reproducing the plurality of channel data in respect of the post edit portion from the record medium based on the designated editing position at the post edit portion designated by the designating step;

a step of storing the reproduced plurality of channel data at the pre edit portion to a first memory at each of the unit of writing data;

a step of storing the reproduced plurality of channel data at the post edit portion to a second memory at each of the unit of writing data;

a step of reading the first specific channel data constituting the pre edit portion designated by the user from the first memory and overwriting the read first specific channel data from a position corresponding to the second specific channel data at the post edit portion stored to the second memory; and a step of recording again the plurality of channel data stored to the second memory to a portion on the record medium situated before the editing processing after the first specific channel data has been overwritten to the second memory.

6. The editing method according to claim 5, further comprising:

a step of recording again the plurality of channel data stored to the first memory to a portion on the record medium situated before the editing processing after the first specific channel data has been overwritten to the second memory.

7. The editing method according to claim 5, further comprising:

a step of performing an erasing processing with respect to the first specific channel data constituting the pre edit portion designated by the user and stored to the first memory after the first specific channel data has been overwritten to the second memory and recording again the plurality of channel data stored to the first memory to a portion on the record medium situated before the editing processing after the first specific channel data has been subjected to the erasing processing.

8. The editing method according to claim 5, further comprising:

a step of escaping the second specific channel data constituting the post edit portion in the second memory to a third memory before the first specific channel data is overwritten to the second memory; and a step of overwriting the second specific channel data read from the third memory on the first specific channel data constituting the pre edit portion designated by the user and stored to the first memory after the first specific channel data has been overwritten to the second memory.

* * * * *